(12) United States Patent
Nagame et al.

(10) Patent No.: US 12,510,969 B2
(45) Date of Patent: Dec. 30, 2025

(54) TACTILE SENSATION PRESENTATION DEVICE, DISPLAY DEVICE, DATA TERMINAL DEVICE, AND TACTILE SENSATION PRESENTATION METHOD

(71) Applicant: Mitsubishi Electric Corporation, Tokyo (JP)

(72) Inventors: Tomohiro Nagame, Tokyo (JP); Koji Tanaka, Tokyo (JP); Mitsuru Sakai, Tokyo (JP); Yosuke Yui, Tokyo (JP); Naoki Numata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 18/720,830

(22) PCT Filed: Dec. 22, 2021

(86) PCT No.: PCT/JP2021/047571
§ 371 (c)(1),
(2) Date: Jun. 17, 2024

(87) PCT Pub. No.: WO2023/119483
PCT Pub. Date: Jun. 29, 2023

(65) Prior Publication Data
US 2025/0068246 A1    Feb. 27, 2025

(51) Int. Cl.
*G06F 3/01*    (2006.01)
*G06F 3/041*   (2006.01)

(52) U.S. Cl.
CPC .............. *G06F 3/016* (2013.01); *G06F 3/041* (2013.01)

(58) Field of Classification Search
CPC ............. G06F 3/016; G06F 3/041; G06F 3/01
See application file for complete search history.

(56) References Cited

U.S. PATENT DOCUMENTS 9,035,918 B2 *  5/2015  Harris ................. G06F 3/016
                                                345/177
9,292,090 B2 *  3/2016  Hirose ................ G06F 3/041
(Continued)

FOREIGN PATENT DOCUMENTS

JP    2006079238 A  *  3/2006
JP    4930957 B2        5/2012
(Continued)

OTHER PUBLICATIONS

International Search Report and Written Opinion mailed on Mar. 15, 2022, received for International Application No. PCT/JP2021/047571, filed on Dec. 22, 2021, 8 pages including English Translation.

*Primary Examiner* — John A Tweel, Jr.
(74) *Attorney, Agent, or Firm* — XSENSUS LLP

(57) ABSTRACT

A signal processing device includes: a fundamental frequency calculation unit for calculating a fundamental frequency from the touch location; a target waveform calculation unit for modulating a waveform of the fundamental frequency by an envelope waveform of a vibration according to the stimulation type to be presented at the touch location, to calculate a target waveform for the vibration to be presented at the touch location. The fundamental frequency calculation unit calculates the fundamental frequency based on a first distance so that the shorter the first distance is, the higher the fundamental frequency is, the first distance being a minimum distance among distances between touch locations and between a touch location and a support of a panel.

10 Claims, 13 Drawing Sheets

(56) References Cited

U.S. PATENT DOCUMENTS

| | | | |
|---|---|---|---|
| 9,317,119 B2 * | 4/2016 | Hirose | G06F 3/044 |
| 2011/0090167 A1 | 4/2011 | Harris | |
| 2011/0248930 A1 * | 10/2011 | Kwok | G06F 3/0488 |
| | | | 345/173 |
| 2014/0132568 A1 | 5/2014 | Hirose et al. | |
| 2016/0132117 A1 | 5/2016 | Adachi et al. | |
| 2017/0038841 A1 | 2/2017 | Takeda et al. | |
| 2018/0190086 A1 | 7/2018 | Alghooneh et al. | |
| 2022/0383710 A1 * | 12/2022 | Ito | G06F 3/016 |

FOREIGN PATENT DOCUMENTS

| | | |
|---|---|---|
| JP | 2013-511108 A | 3/2013 |
| JP | 5378389 B2 | 12/2013 |
| JP | 2015-121983 A | 7/2015 |
| JP | 6032657 B2 | 11/2016 |
| JP | 6037252 B2 | 12/2016 |
| JP | 2018-117512 A | 7/2018 |
| WO | 2009/051976 A1 | 4/2009 |
| WO | 2010/038552 A1 | 4/2010 |
| WO | 2011/062895 A2 | 5/2011 |
| WO | 2015/059887 A1 | 4/2015 |

* cited by examiner

FIG.1
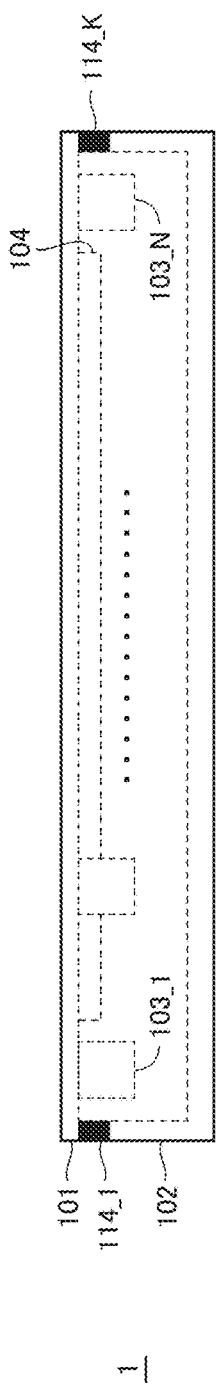
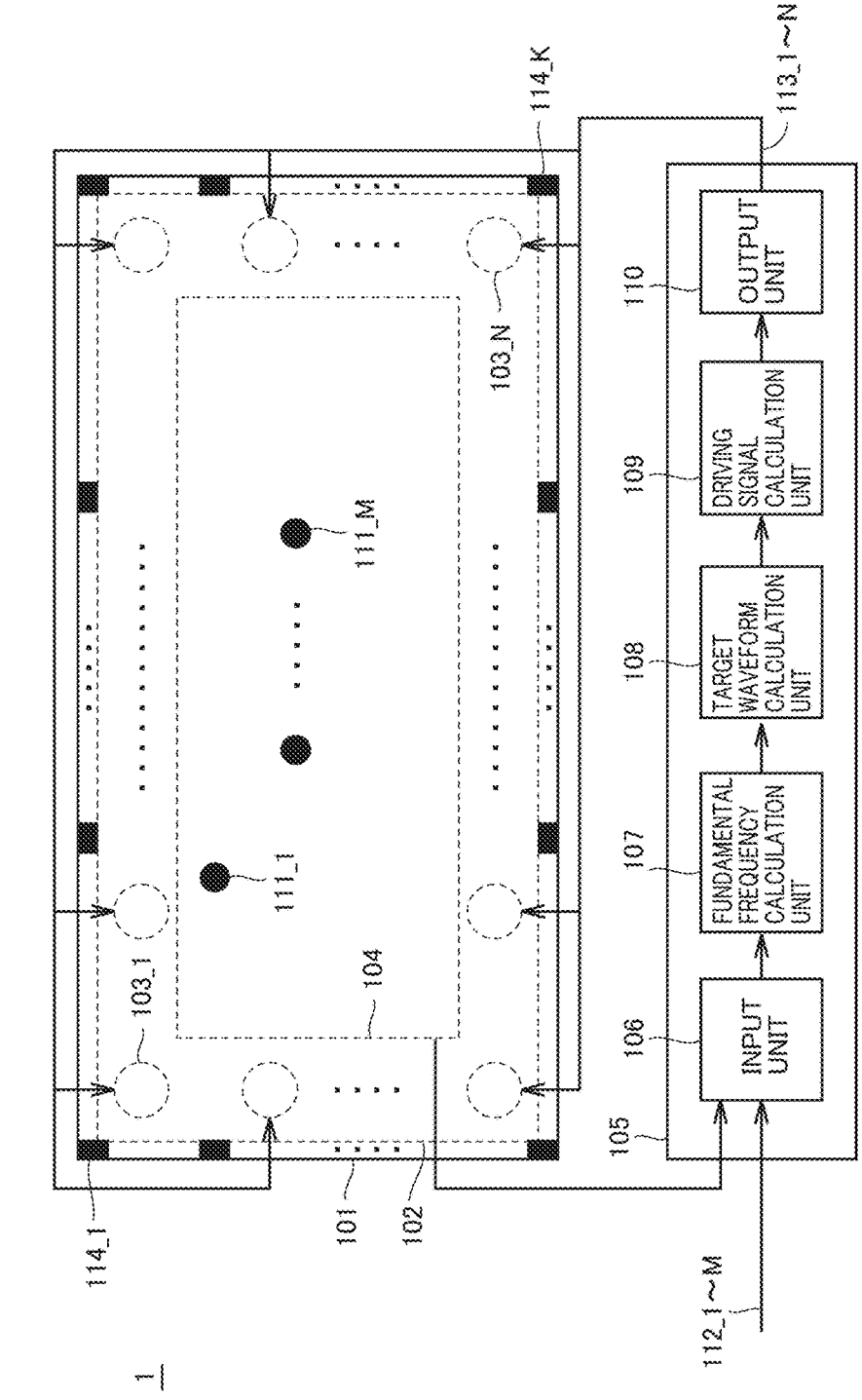

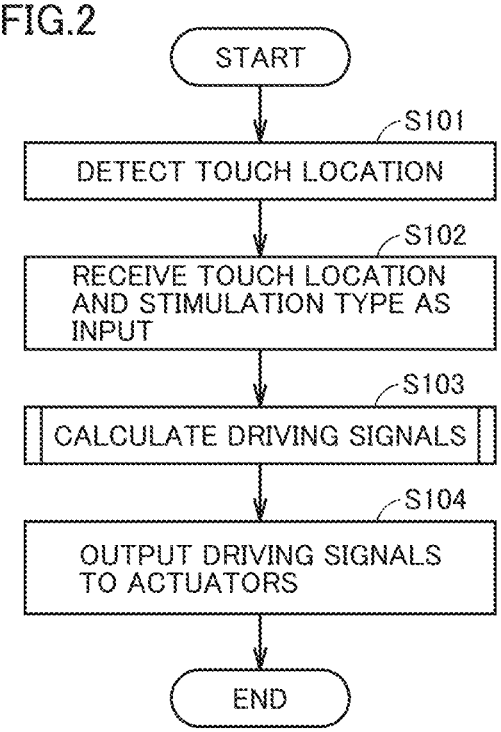
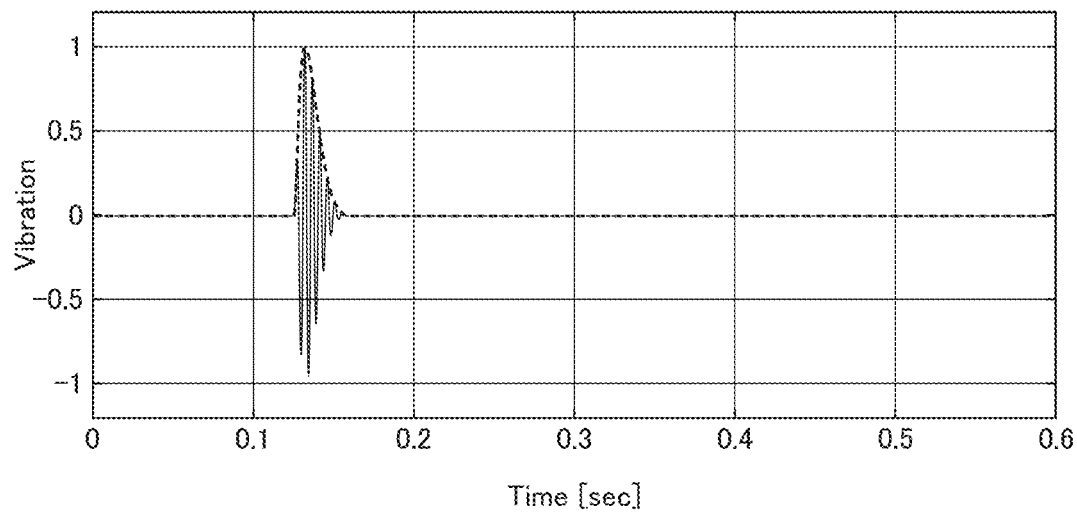

TOUCH PANEL 101     ACTUATORS 103

TOUCH PANEL 101     ACTUATORS 103

TACTILE SENSATION PRESENTATION DEVICE, DISPLAY DEVICE, DATA TERMINAL DEVICE, AND TACTILE SENSATION PRESENTATION METHOD

CROSS-REFERENCE TO RELATED APPLICATION

This application is a national stage application, pursuant to 35 U.S.C. § 371, of International Patent Application No. PCT/JP2021/047571, filed Dec. 22, 2021, the entire contents of which are incorporated herein by reference.

TECHNICAL FIELD

The present disclosure relates to a tactile sensation presentation device, a display device, a data terminal device, and a tactile sensation presentation method.

BACKGROUND ART

More and more public data terminals (e.g., ticket machines and automatic teller machines (ATMs)) and personal data terminals (e.g., car-navigation systems, smartphone, and tablet personal computers (PCs)) are equipped with touch panels. A touch panel is an instrument for detecting an input upon a touch on a panel. In general, a large number of touch panels include a liquid crystal display or an organic electro-luminescence (EL) display and are also called touch displays or touch-sensitive screens. A touch panel detects a user touch on a graphical user interface (GUI) object displayed on a panel or a display.

Such an instrument, in general, has the advantage of a great degree of freedom in arrangement of GUI objects. However, a user interface with a touch panel provides less tactile sensation when a user presses a button, as compared to a conventional user interface with a physical button. Therefore, the user has difficulty in recognizing whether he/she touched the touch panel correctly. In order to solve this problem, methods are proposed for presenting haptic sensations for a user touch location by providing a vibration to a touch panel (e.g., PTLs 1 and 2).

The apparatuses disclosed in PTLs 1 and 2 perform a control so that, if multiple locations are touched simultaneously, the vibration at a certain touch location is greater than the vibrations at the other touch locations, based on the vibration-transfer characteristics from an actuator to the certain touch location, thereby presenting individual vibrations for the respective touch locations.

CITATION LIST

Patent Literature

PTL 1: WO2015/059887
PTL 2: WO2010/038552

SUMMARY OF INVENTION

Technical Problem

Conventional tactile sensation presentation devices, as disclosed in PTLs 1 and 2, may require a large drive voltage to present a desired vibration to a touch location if multiple touch locations have short spacing therebetween or if the touch location is close to a support for the panel.

Therefore, an object of the present disclosure is to provide a tactile sensation presentation device, a display device, a data terminal device, and a tactile sensation presentation method, which present target tactile stimulation by a small drive voltage.

Solution to Problem

A tactile sensation presentation device according to the present disclosure includes: a touch panel; a housing to support the touch panel; a plurality of actuators disposed at different locations so as to cause the touch panel to vibrate; a touch sensor to detect a touch location at which a user's finger or a joystick is in contact with the touch panel; and a signal processing device to: receive the touch location from the touch sensor and a stimulation type to be presented at the touch location; generate driving signals for driving the plurality of actuators; and output the driving signals to the plurality of actuators. The signal processing device includes: an input unit to which the touch location touched by the user and the stimulation type for the touch location are input; a fundamental frequency calculation unit for calculating a fundamental frequency from the touch location; a target waveform calculation unit for modulating a waveform of the fundamental frequency by an envelope waveform of a vibration according to the stimulation type to be presented at the touch location, to calculate a target waveform for the vibration to be presented at the touch location; a driving signal calculation unit for multiplying the target waveform by inverse characteristics of transfer characteristics from each of the plurality of actuators to the touch location to generate the driving signals for driving the plurality of actuators; and an output unit for outputting the driving signals to the plurality of actuators. The fundamental frequency calculation unit calculates the fundamental frequency based on a first distance so that the shorter the first distance is, the higher the fundamental frequency is, the first distance being a minimum distance among distances between touch locations and between a touch location and the support of the touch panel.

A tactile sensation presentation method according to the present disclosure is a tactile sensation presentation method for presenting tactile stimulation to a tactile sensation presentation device, the tactile sensation presentation device including: a touch panel; a housing supporting the touch panel; a plurality of actuators disposed at different locations so as to cause the touch panel to vibrate; a touch sensor for detecting a touch location at which a user's finger or a joystick is in contact with the touch panel; and a signal processing device for receiving the touch location from the touch sensor and a stimulation type to be presented at the touch location, generating driving signals for driving the plurality of actuators, and outputting the driving signals to the plurality of actuators. The tactile sensation presentation method includes: inputting the touch location touched by the user and the stimulation type for the touch location; calculating a fundamental frequency from the touch location; modulating a waveform of the fundamental frequency by an envelope waveform of a vibration according to the stimulation type to be presented at the touch location, to calculate a target waveform for the vibration to be presented at the touch location; multiplying the target waveform by inverse characteristics of transfer characteristics from each of the plurality of actuators to the touch location to generate the driving signals for driving the plurality of actuators; and outputting the driving signals to the plurality of actuators. Calculating the fundamental frequency includes calculating the fundamental frequency based on a first distance so that the shorter the first distance is, the higher the fundamental frequency is, the first distance being a minimum distance among distances between touch locations and between a touch location and the support of the touch panel.

Advantageous Effects of Invention

According to the tactile sensation presentation device and the tactile sensation presentation method of the present disclosure, the target tactile stimulation is presented by a small drive voltage.

BRIEF DESCRIPTION OF DRAWINGS

FIG. 1 shows: (a) which is a side view of a tactile sensation presentation device 1 according to Embodiment 1; and (b) which is a top view of the tactile sensation presentation device 1 according to Embodiment 1.

FIG. 2 is a flowchart depicting an operation of the tactile sensation presentation device 1 according to Embodiment 1.

FIG. 3 is a diagram depicting a vibration waveform and envelope waveform corresponding to Example 1 of tactile stimulation.

DESCRIPTION OF EMBODIMENTS

Figure 4:
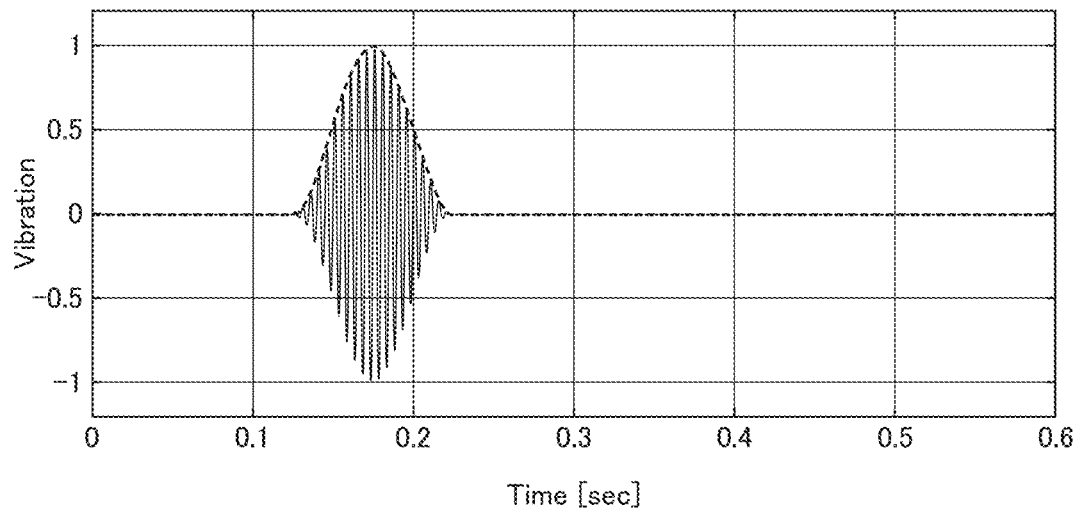
FIG. 4 is a diagram depicting a vibration waveform and envelope waveform corresponding to Example 2 of the tactile stimulation.

Embodiments will be described in detail below, with reference, where appropriate, to the accompanying drawings. Note that detailed description in any greater extent than that considered necessary is omitted. For example, the redundant descriptions on the details of well-known matters and the substantially equal configurations may be omitted. This is to avoid unnecessary redundancy in the following description, and to help with understanding of those who skilled in the art. Note that the inventors offer the accompanying drawings and the following descriptions merely for those skilled in the art to sufficiently understand the disclosure, and not intended to limit the subject scope disclosed in claims.

Embodiment 1

<Configuration of Tactile Sensation Presentation Device>

Part (a) of FIG. 1 is a side view of a tactile sensation presentation device 1 according to Embodiment 1, and (b) of FIG. 1 is a top view of the tactile sensation presentation device 1 according to Embodiment 1.

Referring to (a) and (b) of FIG. 1, the tactile sensation presentation device 1 includes a touch panel 101, a housing 102, N (N is an integer greater than or equal to 1) actuators 103_1 through N, a touch sensor 104, and a signal processing device 105. These components are now described below.

<Touch Panel 101>

The touch panel 101 is operated by a user with a finger. The touch panel 101 is configured of, for example, a plate-like member made of glass or resin. The touch panel 101 may be any insofar as it has a strength to retain the shape and can transfer vibrations to the user to present tactile stimulation. The size, shape, thickness, and material of the touch panel 101 are not specifically limited.

The touch panel 101 may be integrally formed with a display (not shown), such as a thin film transistor (TFT) or an organic EL, so as to be able to display image data. If the touch panel 101 is integrally formed with a display, images such as buttons and knobs can be displayed on the display. This allows the method of touch operation to be presented to the user in an intuitive manner. In such a case, the actuators 103_1 through N (described below) are disposed, for example, on the periphery of the touch panel 101 so as to not interfere with the display area.

<Housing 102>

The housing 102 supports the touch panel 101. The housing 102 is partially connected to the touch panel 101. A support 114 is a point of connection between the touch panel 101 and the housing 102. FIG. 1 shows the touch panel 101 being secured to the housing 102 via K (K is an integer greater than or equal to 1) supports 114_1 through K. The touch panel 101 is separated from the housing 102 so as to not come into contact with the housing 102 without via the supports 114_1 through K. Note that the point of connection and the method of connection are not specifically limited insofar as the housing 102 is connected to the touch panel 101 so as to support the touch panel 101. The housing 102 and the touch panel 101 may be connected to each other via a viscoelastic body such as a silicon rubber (not shown).

<Actuator 103>

The actuator 103 is attached to the touch panel 101 so as to cause the touch panel 101 to vibrate. The actuator 103 is configured of, for example, a voice coil or a piezoelectric transducer. FIG. 1 shows a configuration in which N (N is an integer greater than or equal to 1) actuators 103_1 through N are attached to the touch panel 101. The actuators 103_1 through N are disposed at different locations on the touch panel 101. Note that the actuators 103_1 through N may be any actuator that can cause the touch panel 101 to vibrate, and their types and how they are attached to the touch panel 101 are not specifically limited. The actuators 103_1 through N each may have one end connected to the housing 102. The actuators 103_1 through N each may include an amplifier circuit needed to drive.

<Touch Sensor 104>

The touch sensor 104 senses a location touched by the user with a finger. The touch sensor 104 is configured of, for example, a capacitive-type, sheet-like sensor, and laminated on and integrated with the touch panel 101.

As the user touches different locations simultaneously with fingers, the touch sensor 104 simultaneously senses these touch locations by performing location detection using a large number of electrode rows aligned in vertical and horizontal layers. The number of touch locations that are detectable simultaneously is designed in accordance with the number of simultaneous touches that is expected for the intended use of the device. FIG. 1 shows the case where M simultaneous touches can be performed. The touch sensor 104 may not be of the capacitive-type, insofar as it can sense an expected number of touch locations simultaneously, and its scheme and form are not specifically limited.

<Signal Processing Device 105>

The signal processing device 105 includes an input unit 106, a fundamental frequency calculation unit 107, a target waveform calculation unit 108, a driving signal calculation unit 109, and an output unit 110. These components are now described below.

<Input Unit 106>

The input unit 106 is an electric circuit equipped with an input interface. In the description of the present embodiment, the touch sensor 104 detects M (M is an integer greater than or equal to 1) touch locations. The input unit 106 receives the M touch locations 111_1 through M sensed by the touch sensor 104 and stimulation types 112_1 through M which are to be presented to the respective touch locations 111_1 through M.

<Fundamental Frequency Calculation Unit 107>

The fundamental frequency calculation unit 107 calculates the fundamental frequency for vibrations, based on the touch locations 111_1 through M.

<Target Waveform Calculation Unit 108>

Based on the Fundamental Frequency of Vibrations Calculated by the fundamental frequency calculation unit 107 and the stimulation types 112_1 through M to be presented to the respective touch locations 111_1 through M, the target waveform calculation unit 108 calculates a target waveform for the vibrations to be presented to the respective touch locations 111_1 through M.

<Driving Signal Calculation Unit 109>

Based on the touch locations 111_1 through M and the target waveform of the vibrations to be presented to the respective touch locations 111_1 through M, the driving signal calculation unit 109 calculates driving signals 113_1 through N for the respective actuators 103_1 through N.

<Output Unit 110>

The output unit 110 is an electric circuit equipped with output interfaces which are connected to the respective actuators 103_1 through N. The output unit 110 outputs the driving signals 113_1 through N calculated by the driving signal calculation unit 109 to the respective actuators 103_1 through N.

The signal processing device 105 (the input unit 106, the fundamental frequency calculation unit 107, the target waveform calculation unit 108, the driving signal calculation unit 109, and the output unit 110) is configured of a combination of, for example, a general-purpose digital signal processor (DSP), an application specific integrated circuit (ASIC), a field programmable gate array (FPGA), a memory, a hard disk drive (HDD), input/output interface circuits, a bus circuit coupling these components, an analog-to-digital converter, a digital-to-analog converter, an analog filter circuit, an amplifier circuit for input/output of analog signals, or a combination of software, etc. describing operations of the DSP. The functionalities of such signal inputs/outputs and arithmetic processes can be implemented in various combinations of hardware and software, and the specific configurations are not specifically limited, insofar as such functionalities can be implemented.

<Operations>

Next, an operation of the tactile sensation presentation device 1 according to Embodiment 1 is described.

FIG. 2 is a flowchart depicting an operation of the tactile sensation presentation device 1 according to Embodiment 1.

In S101, as the user touches the touch panel 101, the touch sensor 104, laminated on the touch panel 101, detects the touch locations 111_1 through M.

In S102, the touch locations 111_1 through M detected by the touch sensor 104 and the stimulation types 112_1 through M to be presented to the respective touch locations 111_1 through M are input to the input unit 106 of the signal processing device 105.

What stimulation type of a vibration should be presented to which touch location depends on the specifications of the user interface provided, which is determined outside the tactile sensation presentation device 1 according to the present embodiment.

FIG. 3 is a diagram depicting a vibration waveform and envelope waveform corresponding to Example 1 of the tactile stimulation. In FIG. 3, the solid line indicates a vibration waveform, and the dashed line indicates an envelope waveform.

For example, if the touch location is the display location for a button, a single crispy stimulus is suited, which can give a clicking sensation as if the user presses a button. Thus, a vibration having a short-duration envelope waveform that changes steeply, as indicated by the dashed line of FIG. 3, is presented.

FIG. 4 is a diagram depicting a vibration waveform and envelope waveform corresponding to Example 2 of the tactile stimulation. In FIG. 4, the solid line indicates a vibration waveform, and the dashed line indicates an envelope waveform.

Even for the same single stimulus, if a gentle haptic sensation should be presented, a vibration having a long-duration envelope waveform that smoothly changes, as indicated by the dashed line of FIG. 4, is presented.

Figure 5:
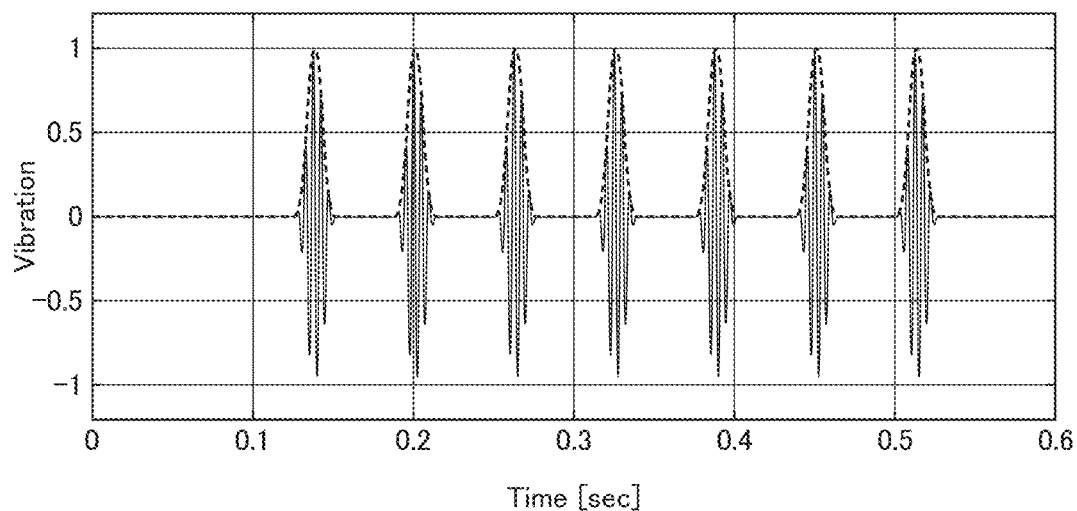
FIG. 5 is a diagram depicting a vibration waveform and envelope waveform corresponding to Example 3 of the tactile stimulation.

FIG. 5 is a diagram depicting a vibration waveform and envelope waveform corresponding to Example 3 of the tactile stimulation. In FIG. 5, the solid line indicates a vibration waveform, and the dashed line indicates an envelope waveform.

If the touch location is the display location for a slidebar, a stimulus that continuously repeats clicking along with the movement of the slidebar is suited. Thus, a vibration having an envelope waveform that repeats peaks, as indicated by the dashed line of FIG. 5, is presented. If a warning should be issued about the touch operation, a stimulus that repeats sharp clicks to draw the user attention is suited, and a vibration having an envelope waveform as indicated by the dashed line of FIG. 5 is presented.

Figure 6:
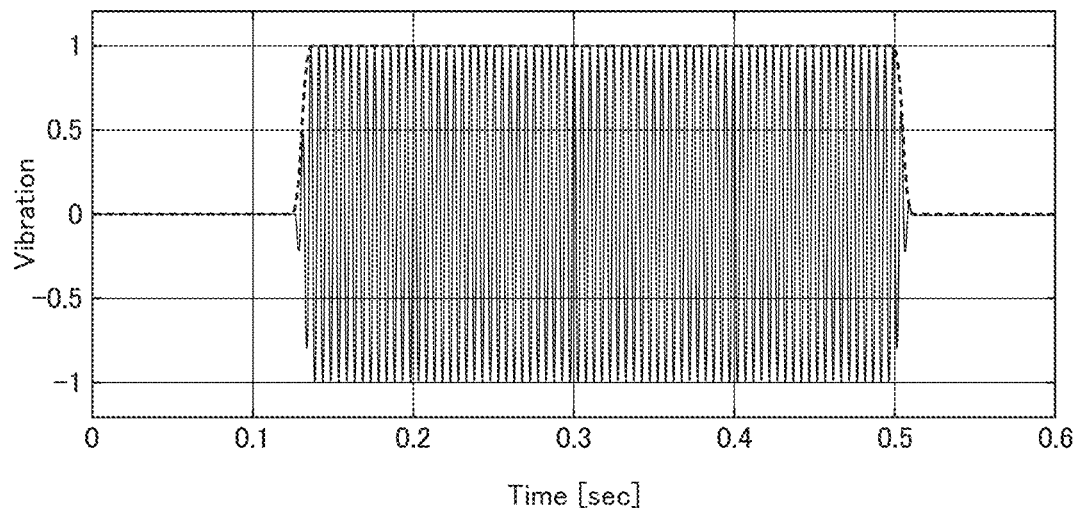
FIG. 6 is a diagram depicting a vibration waveform and envelope waveform corresponding to Example 4 of the tactile stimulation.

FIG. 6 is a diagram depicting a vibration waveform and envelope waveform corresponding to Example 4 of the tactile stimulation. In FIG. 6, the solid line indicates a vibration waveform, and the dashed line indicates an envelope waveform.

In order to continue a touched state for a certain amount of time, like a button for raising and lowering the air conditioning temperature, a stimulus that provides a constant haptic sensation is suited to notify the user that the touched state is recognized. Thus, a vibration having an envelope waveform as indicated by the dashed line of FIG. 6 is presented.

If the user touches a location where no control object is present, no stimulus is presented. In this case, a vibration having an envelope waveform that has zero magnitude is presented at any time instant.

Changes in arrangement and types of control objects displayed on the screen changes the association of the touch location with the stimulation type.

The association of the touch locations 111_1 through M with the stimulation types 112_1 through M changes depending on the intention in presenting the tactile stimulation to the user. Thus, in designing the application software that uses the tactile sensation presentation device 1 according to the present embodiment, the association is set so that the intended function can be presented to the user. In other words, the stimulation types 112_1 through M are determined outside the tactile sensation presentation device 1, and input to the tactile sensation presentation device 1.

In S103, upon input of the touch locations 111_1 through M and the stimulation types 112_1 through M to be presented to the respective touch locations 111_1 through M, the fundamental frequency calculation unit 107, the target waveform calculation unit 108, and the driving signal calculation unit 109, included in the signal processing device 105, perform operations according to STEPs 1, 2, and 3 (described below) to calculate the driving signals for controlling the actuators 103_1 through N.

To prepare the description of STEPs 1 to 3, how the data and operations are handled in the fundamental frequency calculation unit 107, the target waveform calculation unit 108, and the driving signal calculation unit 109 is now described.

In the fundamental frequency calculation unit 107, the target waveform calculation unit 108, and the driving signal calculation unit 109, time-series data that is used for operations, and its frequency-domain data are all handled as sampled digital data. By way of example, here, the sampling frequency is 2048 Hz. A sampling theorem is known that the sampled data can preserve information up to half the sampling frequency. With the sampling frequency of 2048 Hz, the sampled data can preserve the bands up to approximately 1 kHz. The sampling frequency may be determined in accordance with the frequency band of the vibrations handled. A frequency band centered at 200 to 300 Hz is often used for the presentation of a haptic sensation via a vibration. In that case, the sampling frequency of 2048 Hz is sufficient.

The numerical values in the time-series data are digitized too. The digital value, which has a data format having accuracy sufficient to cause no large calculation error, is used. For example, using a double-precision floating point data type enables sufficient reduction in calculation error. Here, the numerical values of the time-series data are held as double-precision floating point data.

In the present embodiment, a description is given in which the time-series data is transformed into frequency-domain data, where appropriate. Since the time-domain data and the frequency-domain data are mutually convertible by discrete Fourier transform and inverse discrete Fourier transform, there is no substantial difference in storing and calculating data in either domain. In other words, equivalent operation can be performed in either domain insofar as the time-domain data and the frequency-domain data are appropriately associated with each other by the discrete Fourier transform and the inverse discrete Fourier transform. The configuration according to the present invention is not limited to the method of storage and calculation of data described in the present embodiment.

Figure 7:
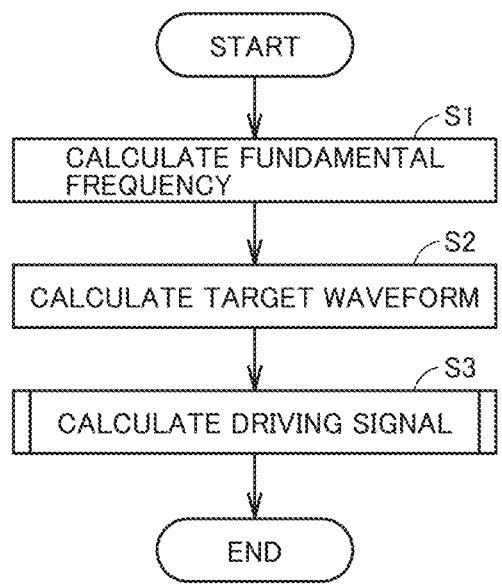
FIG. 7 is a flowchart showing specific steps for S103.

FIG. 7 is a flowchart illustrating detailed steps for S103.

Operations performed in STEPs 1 to 3 of FIG. 7 are now described below.

<Step 1: Calculation of Fundamental Frequency>

The fundamental frequency calculation unit 107 calculates a fundamental frequency $f_c$ of the vibration waveform to be presented on the touch panel 101, based on the touch locations 111_1 through M.

Steps for calculation of the fundamental frequency $f_c$ are illustrated below.

The fundamental frequency calculation unit 107 calculates a minimum distance $D_{min}$ (hereinafter, referred to as a minimum distance $D_{min}$), of the distances between any two points among the touch locations 111_1 through M and the distances between any of the touch locations 111_1 through M and any of the supports 114_1 through K of the panel. The minimum distance $D_{min}$ is now described in more detail. The fundamental frequency calculation unit 107 calculates the distance between all the combinations of the touch location 111_$i$ and the touch location 111_$j$ (i=1 through M, j=1 through M, i≠j), and the combinations of the touch location 111_$i$ and the support 114_$j$ (i=1 through M, j=1 through K), and sets the shortest distance of the calculated distances as the minimum distance $D_{min}$.

The touch location 111 is where the user's hand or finger or a joystick for operating the touch panel 101 is in contact with the touch panel 101. The joystick is a device, such as a touch pen or a touch bar, which is held by the user with hand to operate the touch panel 101. The shape, material, and size of the joystick may be any insofar as the joystick allows the operations on the touch panel 101.

The support 114 is where the touch panel 101 is connected and secured to the housing 102. If there are a number of locations where the touch panel 101 is secured to the housing 102, there are a number of supports 114 as well. FIG. 1 shows a configuration in which there are K number of supports 114 (the supports 114_1 through K).

Figure 8:
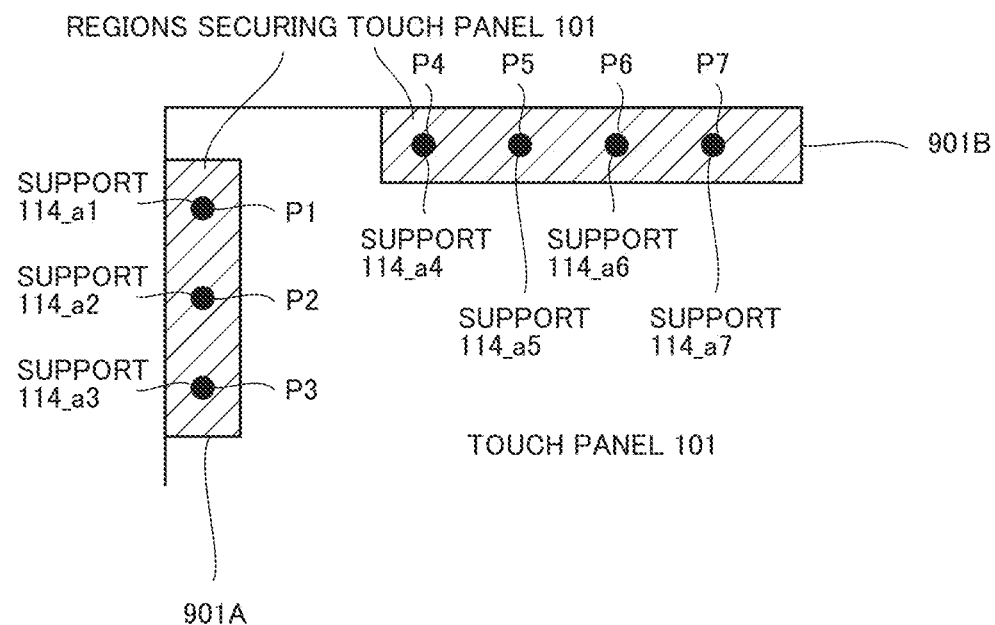
FIG. 8 is a diagram depicting a touch panel 101 secured in continuous regions.

FIG. 8 is a diagram depicting the touch panel 101 that is secured in continuous regions.

As shown in FIG. 8, if the touch panel 101 is secured in continuous regions 901A and 901B, discrete locations P1, P2, P3, P4, P5, P6, and P7 are set so as to fill the entire regions, and the supports 114_a1 to a7 are present at the these locations P1 to P7. In this case, narrower spacing is preferable between the supports 114a1 to a3 and between the supports a4 to a7. However, the spacing between the supports is sufficient if it is approximately the same as a potential spacing between the touch locations 111 (described below) because this will not cause any large error in calculation of the distance between the touch location 111 and the support 114. All the locations of the supports 114 on the touch panel 101 are previously recorded in a memory device (not shown) such as a non-volatile memory, and referred to to calculate the minimum distance $D_{min}$.

Next, the fundamental frequency calculation unit 107 calculates a frequency at which the wavelength on the touch panel 101 is a times the minimum distance $D_{min}$ (where α is a predetermined constant) and sets the frequency as the fundamental frequency $f_c$. Preferably, the constant α is a small value. Here, α=12. In the following, a method of calculation of the frequency at which the wavelength is a times the minimum distance $D_{min}$ is described in detail.

In general, the wavelength of a vibration propagating through a plate-like member such as the touch panel 101 depends on a frequency. For example, the relationship between the frequency f and wavelength λ of the vibration (bending wave) propagating over a plate is known to be represented as Equation (1):

[Math 1]

$$f = \frac{2\pi}{\lambda^2}\sqrt{\frac{Eh^2}{12(1-v^2)\rho}} \quad (1)$$

where, E is Young's modulus of a material of the plate, ρ is density, v is Poisson's ratio, and h is the thickness of the plate.

The fundamental frequency calculation unit 107 assigns the physical property values (Young's modulus E, density ρ, Poisson's ratio v, and the plate thickness h) of the touch panel 101 to Equation (1), and further assigns ($D_{min}$×α) to the wavelength λ to determine the frequency f when the wavelength λ is ($D_{min}$×α), and sets the frequency f as the fundamental frequency $f_c$.

Note that the physical property values of the touch panel 101 required to calculate Equation (1) may be specification values based on the materials and dimensions at the design phase, or measurement values obtained by performing extra measurement. In either case, the physical property values are held in a memory device (not shown) such as a non-volatile memory included in the fundamental frequency calculation unit 107 and referred to calculate Equation (1).

As a method independent of Equation (1), a translation table representing the relationship between a frequency and a wavelength can be created beforehand. The relationship between a frequency and a wavelength can be determined by directly measuring the touch panel 101 or using an approach such as finite element analysis. A translation table is created using the determination. For this approach, the created translation table is stored in a memory device (not shown) such as a non-volatile memory included in the fundamental frequency calculation unit 107, and the fundamental frequency calculation unit 107 refers to a frequency corresponding to the wavelength ($D_{min}$×α) to set it as the fundamental frequency $f_c$.

As described above, the frequency corresponding to the wavelength, which is a factor of α of the minimum distance $D_{min}$, is calculated as the fundamental frequency $f_c$.

At this time, the wavelength λ has a length a times the minimum distance $D_{min}$, that is, a length proportional to the minimum distance $D_{min}$. Thus, the shorter the minimum distance $D_{min}$ is, the shorter the wavelength λ is. In contrast, the frequency f is inversely proportional to the square of the wavelength λ, as can be seen from Equation (1), and the shorter the wavelength λ is, the higher the corresponding frequency f is. Accordingly, here, the shorter the minimum distance $D_{min}$ is, higher the calculated fundamental frequency $f_c$ is.

The descriptions will be given below as to the reason why the minimum distance $D_{min}$ is selected to calculate the fundamental frequency $f_c$ from among the distances between the touch locations 111_1 through M and the distances between the touch locations 111_1 through M and the supports 114_1 through K. The descriptions will also be given below as to the reason why the constant α is 12, and a method of setting an appropriate value for a.

<Step 2: Calculation of Target Waveform>

The target waveform calculation unit 108 calculates a target waveform $Y_m(f)$ of a vibration to be presented to the touch location 111_m (m=1 through M).

$Y_m(f)$ is frequency-domain data for a waveform that is obtained by modulating the sine wave of the fundamental frequency $f_c$ by the envelope waveform of the vibration to be presented to the touch location 111_m, which is calculated according to Equation (2):

[Math 2]

$$Y_m(f) = DFT(ENV_m(t) \cdot \sin(2\pi \cdot f_c \cdot t)) \quad (2)$$

In Equation (2), DFT represents Fourier transform, which transforms a time signal into a frequency signal. sin( ) is a sinusoidal function, f is the frequency, and t is an index representing time.

$ENV_m(t)$ (m=any of 1 through M) is the envelope waveform of the vibration to be presented to the touch location 111_m, and determined based on the stimulation type 112_m to be presented.

For example, if the stimulation type is a crisp-feel single stimulus like a clicking sensation, the envelope waveform is a short-duration waveform that changes steeply as the dashed line of FIG. 3.

Even for the same single stimulus, if a gentle haptic sensation should be presented, the envelope waveform is a long duration waveform that changes smoothly, as indicated by the dashed line of FIG. 4. For a stimulus that continuously repeats clicking, the envelope waveform repeats peaks, as indicated by the dashed line of FIG. 5. For a stimulus that continues constantly, the envelope waveform maintains a certain value, as indicated by the dashed line of FIG. 6.

If the touch location 111_m is where no vibration is to be presented, $ENV_m(t)=0$ holds true, and the target waveform at that location satisfies $Y_m(f)=0$.

Here, the solid lines of FIGS. 3 to 6 indicate the waveforms of $Y_m(f)$ for the respective envelope waveforms.

The envelope waveforms associated with the respective stimulation types are predetermined as such, and its correspondence table and all the envelope waveform data for use are stored in a memory device (not shown) such as a non-volatile memory within the target waveform calculation unit 108. Using the correspondence table, the target waveform calculation unit 108 refers to an envelope waveform $ENV_m(t)$ corresponding the input stimulation type 112_m (m=1 through M).

<Step 3: Calculation of Driving Signal>

The driving signal calculation unit 109 calculates a driving signal 113_n for the actuator 103_n (n=1 through N).

The driving signal 113_n is represented by $X_n(f)$. The transfer characteristics of the vibration transferring to the touch location 111_m (m=1 through M) via the actuator 103_n (n=1 through N) is represented by $G_{mn}(f)$, where f is an index for the frequency, and $X_n(f)$ and $G_{mn}(f)$ are frequency-domain data.

The vibration-transfer characteristics can be calculated by applying a voltage of a reference signal to a respective actuator, and measuring the vibration that is produced at the touch location in response. White noise, an impulse, or a wideband signal such as time stretched pulse (TSP) is generally employed as the reference signal. Regarding the points of measurement, for example, potential locations for the touch locations 111_1 through M are set in a grid pattern in an area in which a touch operation is expected to be performed on the touch panel 101. The transfer characteristics data may be previously measured at all the combinations of the actuators 103_1 through N and the grid points.

The measured vibration-transfer characteristics data are previously stored in a memory device (not shown) such as a non-volatile memory included in the driving signal calculation unit 109, and the vibration-transfer characteristics data for the grid points corresponding to the touch locations 111_1 through M are used to calculate the driving signals 113_1 through N. If the actual touch locations 111_1 through M differ from the grid points for the measured transfer characteristics, the vibration-transfer characteristics to the grid points closest to the touch locations 111_1 through M may be used as the transfer characteristics to the touch locations 111_1 through M. Alternatively, the transfer characteristics to the touch locations 111_1 through M may be determined by interpolating transfer characteristics from the transfer characteristics to several grid points around the touch locations 111_1 through M. A narrower spacing is preferable between the grid points since it causes less difference between the grid points and the actual touch locations 111_1 through M. However, considering the size of the tip of a finger, 1 cm or less is sufficient.

$X_n(f)$ (n=1 through N) is calculated by multiplying $Y_m(f)$ (m=1 through M) by characteristics counteracting the transfer characteristics of the vibrations reaching the touch locations 111_1 through M via the actuators 103_1 through N, so that the vibration at the touch location 111_m (m=1 through M) is $Y_m(f)$. Specific steps for the calculation are presented below.

The driving signal calculation unit 109 calculates a matrix $[H_{nm}(f)]$ that has inverse characteristics of the matrix $[G_{mn}(f)]$ having the vibration-transfer characteristics $G_{mn}(f)$ as an element in the mth row and the nth column, and calculates a vector by multiplying a vector $[Y_m(f)]$ having $Y_m(f)$ as the mth element by $[H_{nm}(f)]$. The nth element in the calculated vector is the driving signal $X_n(f)$. In other words, the driving signal $X_n(f)$ is calculated according to Equation (3):

[Math 3]

$$[X_n(f)] = [H_{nm}(f)] \times [Y_m(f)] \quad (3)$$

Note that $[A_{mn}]$ represents a matrix having $A_{mn}$ as the element in the mth row and the nth column, and [B] represents a vector having $B_n$ as the nth element.

Here, the matrix having the inverse characteristics of $[G_{mn}(f)]$ is a matrix which has characteristics counteracting $[G_{mn}(f)]$ and in which $[G_{mn}(f)] \times [H_{nm}(f)]$ is close to the identity matrix. For example, if the number M of touch locations 111_1 through M is the same as the number N of actuators 103_1 through N, that is, if M=N holds true, $[H_{nm}(f)]$ can be determined as an inverse of the matrix $[G_{mn}(f)]$. In contrast, if the number M of the touch locations 111_1 through M and the number N of the actuators 103_1 through N does not match, the inverse matrix $[H_{nm}(f)]$ can be determined as a generalized inverse matrix. Determining $[H_{nm}(f)]$ as a generalized inverse matrix enables calculation of a matrix in which $[G_{mn}(f)] \times [H_{nm}(f)]$ is the identity matrix if N is greater than M. If M is greater than N, an exact inverse matrix cannot be determined, but a matrix having approximately the inverse characteristics can be calculated.

Even though the number M of touch locations 111_1 through M is the same as the number N of actuators 103_1 through N, $[G_{mn}(f)]$ may not have an inverse matrix due to being rank deficient. In that case, an inverse matrix $[H_{nm}(f)]$ may be determined as a generalized inverse matrix, or as an inverse matrix of $[cI+G_{mn}(f)]$. Here, I is the identity matrix, and c is a constant. An approach for determining an inverse matrix by adding cI is known as an approach that prevents divergence of the inverse matrix caused by rank deficient. In this case also, an exact solution cannot be determined, but a matrix having approximately the inverse characteristics can be calculated.

As described above, $[H_{nm}(f)]$ can be determined using many generally-known approaches, including an approximate solution, and the method of determination is not specifically limited insofar as the matrix has characteristics counteracting $[G_{mn}(f)]$. However, if the number N of actuators 103_1 through N is less than the number M of touch locations, the accuracy of $[H_{nm}(f)]$ as the inverse characteristics may greatly deteriorate. In order to calculate $[H_{nm}(f)]$ that has good inverse characteristics of $[G_{mn}(f)]$, the number N of actuators 103_1 through N may be greater than or equal to the number M of touch locations 111_1 through M.

According to STEPs 1 to 3 described above, the driving signals 113_1 through N are calculated by the fundamental frequency calculation unit 107, the target waveform calculation unit 108, and the driving signal calculation unit 109 included in the signal processing device 105.

In S104 of FIG. 2, the output unit 110 of the signal processing device 105 outputs the driving signal 113_n ($X_n(f)$) (n=1 through N) to a corresponding actuator 103_n.

In response to receiving the driving signal 113_n ($X_n(f)$), the actuator 103_n (n=1 through N) vibrates, causing the touch panel 101 to vibrate. At this time, the vibration produced at the touch location 111_m (m=1 through M) is superposition of the vibrations of the actuators 103_1 through N having reached the touch location 111_m.

In other words, since the transfer characteristics of the vibration transferring to the touch location 111_m (m=1 through M) via the actuator 103_n (n=1 through N) is represented by $G_{mn}(f)$, the vibration waveform $Y'_m(f)$ produced at the touch location 111_m is represented by Equation (4):

[Math 4]

$$[Y'_m(f)] = [G_{mn}(f)] \times [X_n(f)] \quad (4)$$

Here, referring to Equation (3), the following equation holds true:
[Math 5]

$$[Y'_m(f)] = [G_{mn}(f)] \times [X_n(f)] = [G_{mn}(f)] \times [H_{nm}(f)] \times [Y_m(f)] \quad (5)$$

Since $[H_{nm}(f)]$ is the matrix having the inverse characteristics of $[G_{mn}(f)]$, the matrix $[G_{mn}(f)]$ having the vibration-transfer characteristics and the matrix $[H_{nm}(f)]$ having the inverse characteristics of $[G_{mn}(f)]$ counteract each other, presenting, to the respective touch location 111_$m$, the vibration waveform $Y'_m(f)$ that is generally coincide with the target waveform $Y_m(f)$.

<Functionality and Advantages>

Functionality and advantages of the calculation of the fundamental frequency $f_c$ according to STEP 1 by the fundamental frequency calculation unit 107 of the tactile sensation presentation device according to the present embodiment are now described.

<Relationship Between Fundamental Frequency $f_c$ and Distribution of Vibration>

In the present embodiment, the target waveform $Y_m(f)$ is obtained by modulating the sine wave of the fundamental frequency $f_c$, and the driving signal $X_n(f)$ is obtained by multiplying the target waveform $Y_m(f)$ by the transfer characteristics of a vibration. Thus, the actuator 103 vibrates using primarily the frequency content around the fundamental frequency $f_c$. As can be seen from Equation (1), as the frequency f is determined, a corresponding wavelength λ is determined. Vibrations propagating over the touch panel 101 from the respective actuators 103 are sinusoidal vibrations having a wavelength (hereinafter, referred to as a wavelength $\lambda_c$) corresponding to the fundamental frequency $f_c$.

The vibration produced on the touch panel 101 is superposition of propagating waves from the respective actuators 103 and reflected waves off the end portions of the touch panel 101. Various distributions of vibrations, including progressive waves and standing waves, can be formed by changing the magnitudes and phases of the driving signals 113 driving the actuators 103.

In either case, however, the vibrations propagating from the respective actuators 103 have the wavelength $\lambda_c$, and the vibration on the touch panel 101 formed by superposition of such vibrations has the distribution of vibrations that varies, generally, in a sinusoidal manner of the wavelength $\lambda_c$.

FIGS. 9 to 12 are diagrams depicting an example distribution of vibrations on the touch panel 101.

Figure 9:
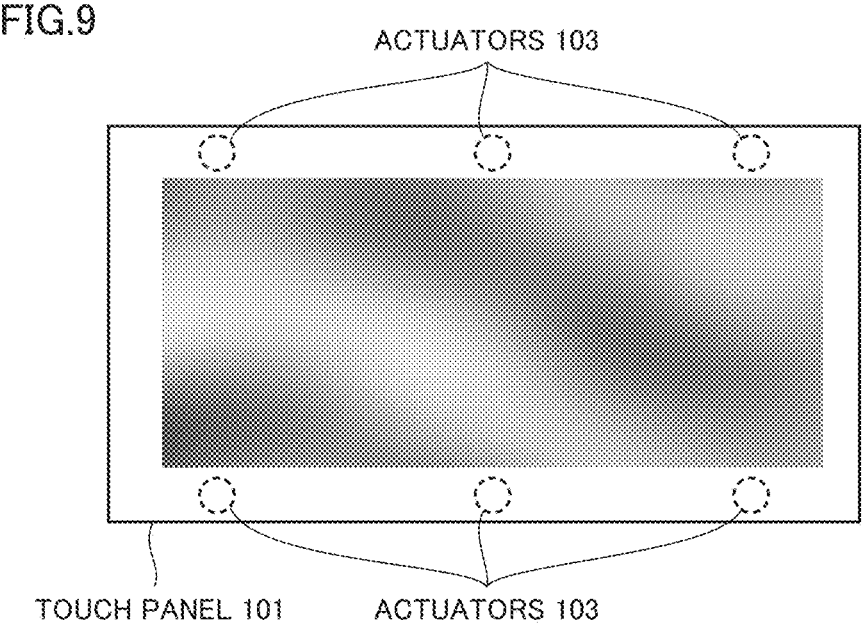
FIG. 9 is a diagram depicting an example distribution of vibrations on the touch panel 101.
Figure 10:
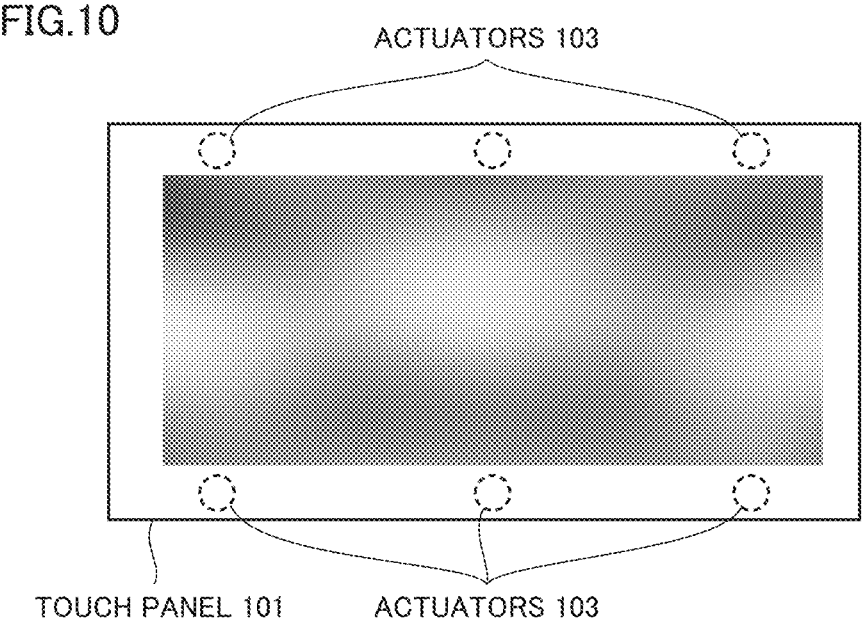
FIG. 10 is a diagram depicting an example distribution of vibrations on the touch panel 101.
Figure 11:
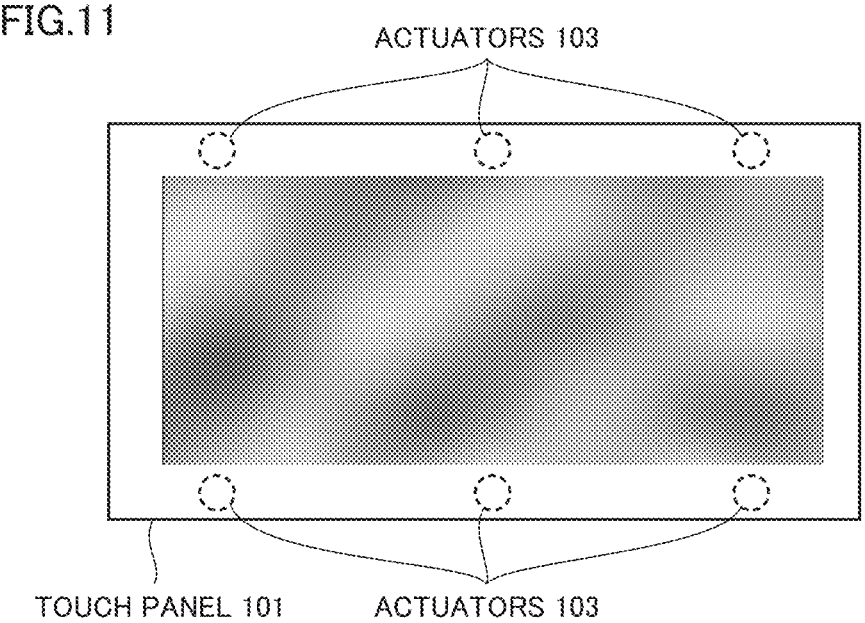
FIG. 11 is a diagram depicting an example distribution of vibrations on the touch panel 101.
Figure 12:
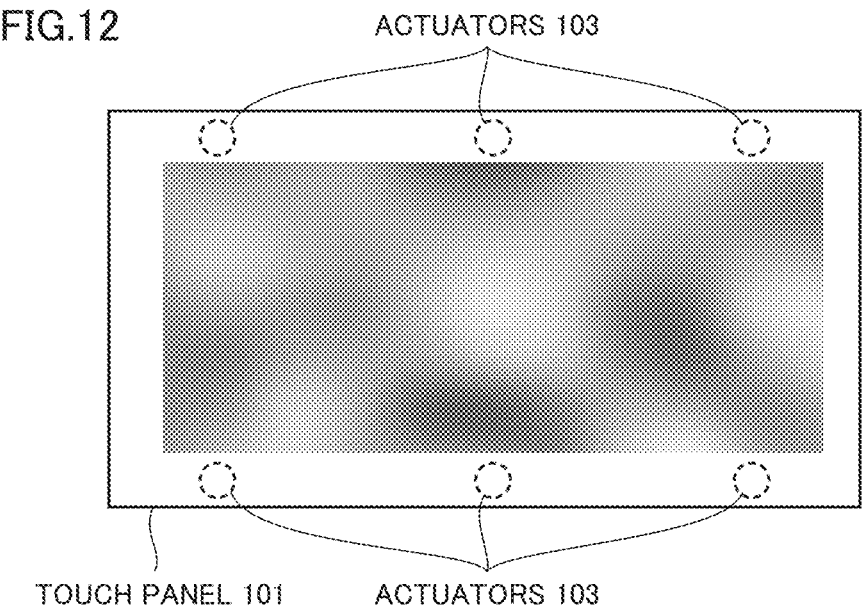
FIG. 12 is a diagram depicting an example distribution of vibrations on the touch panel 101.

FIG. 9 depicts an example distribution of vibrations at a moment when $f_c$ is 200 Hz. FIG. 10 depicts another example distribution of vibrations when $f_c$ is 200 Hz. FIG. 11 depicts an example distribution of vibrations when $f_c$ is 300 Hz. FIG. 12 depicts another example distribution when $f_c$ is 300 Hz.

Displacement of the vibrations is shown in shades of color (black and white), a darker (closer to black) area indicating larger vibration displacement (larger in the positive direction), a lighter (closer to white) area indicating smaller vibration displacement (larger in the negative direction). The dashed circles indicate the locations of the actuators 103. An example distribution of vibrations is illustrated in which six actuators 103 are configured. The distribution of vibrations is shown only in the area in which touch operations are performed and which is inside the locations where the actuators 103 are disposed.

While FIGS. 9 and 10 both depict distributions of vibrations when the fundamental frequency $f_c$ is 200 Hz, the distributions of vibrations differ because the magnitude and phase of the signals driving the actuators 103 are different. Similarly, while FIGS. 11 and 12 both depict the distribution of vibrations when the fundamental frequency $f_c$ is 300 Hz, the distribution of vibrations of FIG. 11 and FIG. 12 differ because the magnitude and phase of the signals driving the actuators 103 are different. As such, various distributions of vibrations are formed by changing the magnitudes and phases of the signals driving the respective actuators 103.

However, in any of FIGS. 9 to 12, the vibrations on the touch panel 101 are kept distributed continuously at locations proximate to each other, while varying, generally, in a sinusoidal manner.

Comparing FIGS. 9 and 10, although the distributions of vibrations differ, the positive and negative areas of the vibrations are distributed with generally the same spacing. This is because the signals driving the respective actuators 103 have the same frequency, despite of different magnitudes and phases, causing the vibrations produced on the touch panel 101 to have the same wavelength. Similarly, comparing FIGS. 11 and 12, the positive and negative areas of the vibrations are distributed with generally the same spacing. This is also because the signals driving the respective actuators 103 have the same frequency, causing the vibrations produced on the touch panel 101 to have the same wavelength.

In contrast, comparing between FIGS. 9 and 10 and FIGS. 11 and 12 with respect to the spacing between the areas in which positive and negative of vibrations are inverted, the spacing of FIGS. 11 and 12 are narrower than that of FIGS. 9 and 10. In other words, the distributions of vibrations shown in FIGS. 9 and 10 vary spatially slowly, while the distributions of vibrations shown in FIGS. 11 and 12 vary spatially rapidly. This is because the fundamental frequency $f_c$ is lower and the produced vibrations have a longer wavelength $\lambda_c$ in FIGS. 9 and 11 than in FIGS. 1 and 12.

<Relationship Between Fundamental Frequency $f_c$ and Drive Voltage>

The vibrations on the touch panel 101 has a continuous sinusoidal distribution and vibrations produced close to each other on the touch panel 101 are similar to each other. Since the lower the fundamental frequency $f_c$ is, the longer the wavelength $\lambda_c$ is, the distribution of vibrations on the touch panel 101 varies slowly. Therefore, the difference in vibration is small between two points proximate to each other with a certain distance therebetween.

If there are distinctive target vibrations for the two touch locations 111 located proximate to each other as such, or if the target vibration is presented at the touch location 111 near the support 114, the driving signal 113 is calculated in STEP 3 so that a minute difference in vibration between these two points is amplified and different vibrations are formed. As a result, the longer the wavelength $\lambda_c$ is, that is, the lower the fundamental frequency $f_c$ is, the greater the magnitude of the driving signal 113 is, increasing the drive voltage required to output the driving signal 113.

Specific description in this regard is described below.

FIGS. 13 to 17 are schematic views each depicting a cross section of the distribution of vibrations produced on a linear line on which the touch panel 101 lies. As shown in FIG. 13 through 17, suppose that the distribution of vibrations is of the standing wave, and nodes (where the vibrations have zero amplitude) and antinodes (where the vibrations have a maximum amplitude) are formed as shown in the respective figures.

Figure 13:
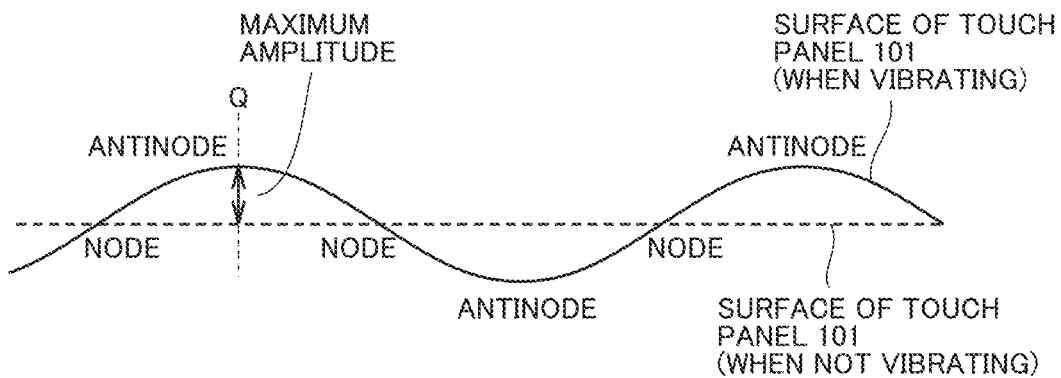
FIG. 13 is a schematic view depicting a cross section of the distribution of vibrations produced on a linear line on which the touch panel 101 lies.

FIG. 13 depicts a vibration waveform of Case 1. In Case 1, a target vibration is presented on one touch location 111.

If the standing wave is formed so that an antinode lies at a point Q, which is the presentation location of a vibration, a vibration can be caused with the maximum amplitude of the standing wave, which is therefore most efficient way of presentation of a large vibration. In other words, the target vibration can be presented by a small driving signal 113, that is, a small drive voltage, by adjusting the amplitudes and phases of the driving signals 113 for the respective actuators 103 to form the distribution of vibrations so that an antinode lies at the point Q.

Figure 14:
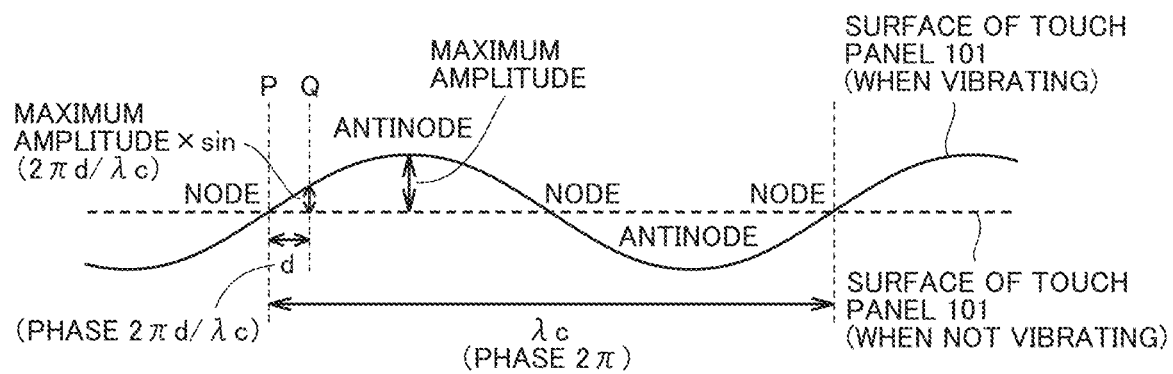
FIG. 14 is a schematic view depicting a cross section of the distribution of vibrations produced on the linear line on which the touch panel 101 lies.

FIG. 14 depicts a vibration waveform of Case 2. In Case 2, the fundamental frequency $f_c$ is 200 Hz, and a target vibration is presented at one of two touch locations 111 close to each other, while maintaining the other one of touch locations 111 vibration free (a vibration having zero magnitude).

Suppose that a point P is maintained vibration free, and a target vibration is presented at the point Q that is apart from the point P by a certain distance d. In order to cause no vibrations at the point P, a standing wave that has a node at the point P needs to be formed. At this time, if the distance d is small, the distribution of vibrations is continuous. Consequently, an antinode of the standing wave does not lie at the point Q, causing the magnitude of the vibration produced at the point Q to be less than the maximum amplitude of the standing wave. More specifically, the magnitude of the vibration produced at the point Q depends on how much the distance d between the points P and Q corresponds to the phase difference of the sine wave having the wavelength $\lambda_c$. The phase difference at this time is $(2\pi d/\lambda_c)$, which is a factor of $|\sin(2\pi d/\lambda_c)|$ of the maximum amplitude of the standing wave. In order to present the vibration that has the same magnitude as Case 1 at the point Q, the magnitude of the vibration at the point Q needs to be amplified by a factor of $|1/\sin(2\pi d/\lambda_c)|$, and the driving signal 113 needs to be made large as much. Note that |*| is an operation symbol representing the absolute value of *. The phases, herein, are all represented in units of a radian.

From the foregoing, Case 2, in which the target vibration is presented at one of the two touch locations 111 apart from each other by the distance d, while maintaining the other one of the two touch locations 111 vibration free, requires the driving signal 113 having the magnitude of, generally, a factor of $|1/\sin(2\pi d/\lambda_c)|$ and the drive voltage for that driving signal 113, as compared to Case 1 in which the target vibration is presented at a single touch location 111.

Figure 15:
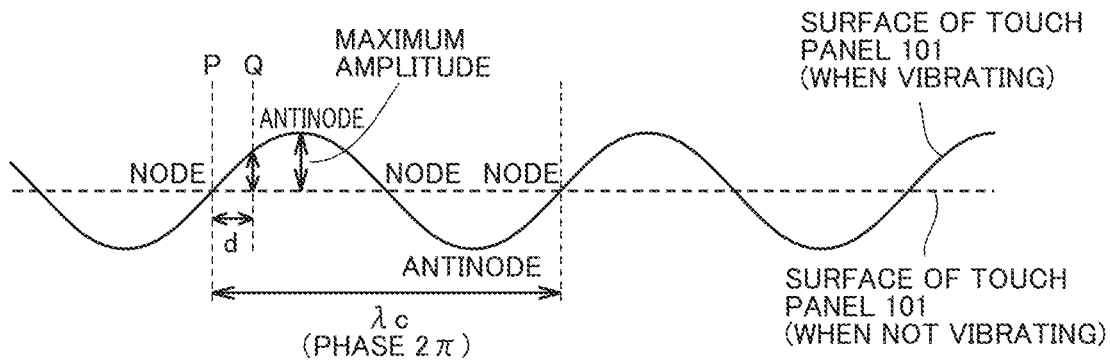
FIG. 15 is a schematic view depicting a cross section of the distribution of vibrations produced on the linear line on which the touch panel 101 lies.

Next, referring to FIGS. 14 and 15, a description is given with respect to the driving signal 113 where the fundamental frequency $f_c$ differs, and where the drive voltage for that driving signal 113 differs.

FIG. 15 depicts the vibration waveform of Case 3. In Case 3, the fundamental frequency $f_c$ is 300 Hz, and target vibration is presented at one of two touch locations 111 that are close to each other, while maintaining the other one of the two touch locations 111 vibration free (a vibration having zero magnitude).

In both Case 2 and Case 3, while the vibration varies in a sinusoidal manner in correspondence with a location, the variation is slower in Case 2 (FIG. 14) where the fundamental frequency $f_c$ is lower because a corresponding wavelength $\lambda$ is longer. The variation is more rapid in Case 3 (FIG. 15) where the fundamental frequency $f_c$ is higher because a corresponding wavelength $\lambda_c$ is shorter. Similarly to Case 2, suppose that, in Case 3, a node of the standing wave is formed at a point P and the target vibration is presented at a point Q that is apart from the point P by a certain distance d. At this time, the vibration that is produced at the point Q depends on the phase difference $(2\pi d/\lambda_c)$ determined by the wavelength $\lambda_c$ and the distance d, as mentioned above, resulting in having the magnitude of a factor of $|\sin(2\pi d/\lambda_c)|$ of the maximum amplitude of the standing wave. In other words, in a range in which the distance d is small, the longer the wavelength $\lambda_c$ is (the lower the fundamental frequency $f_c$ is), the smaller the vibration at the point Q is. Then, in order to compensate for this and present the vibration that has the same magnitude as Case 1 at the point Q, the driving signal 113 that has a magnitude by a factor of $|\sin(2\pi d/\lambda_c)|$ of Case 1 is required. Thus, in a range in which the distance d is small, the longer the wavelength $\lambda_c$ is (the lower the fundamental frequency $f_c$ is), the greater the driving signal 113 and the drive voltage required to output the driving signal 113 need to be.

For example, comparing FIGS. 14 and 15, Case 2 (FIG. 14), where the fundamental frequency $f_c$ is lower, has a smaller vibration at the point Q than Case 3 (FIG. 15). In order to present the vibration having the same magnitude at the point Q, Case 2, where the fundamental frequency $f_c$ is lower, needs to have an increased driving signal 113.

While Case 2 and Case 3 have been described where the vibration at the point P has zero amplitude, a case is now described where the amplitude of a vibration is not zero.

Figure 16:
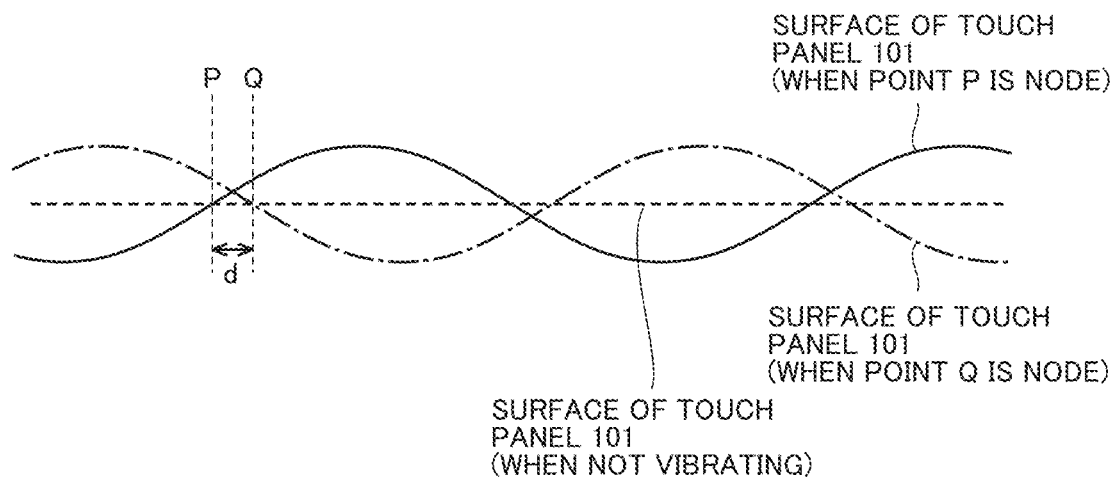
FIG. 16 is a schematic view depicting a cross section of the distribution of vibrations produced on the linear line on which the touch panel 101 lies.

FIG. 16 depicts a vibration waveform of Case 4. In Case 4, distinctive vibrations whose amplitudes are not zero are presented at the point P and the point Q.

The solid line of FIG. 16 represents the standing wave that is formed to have a node at the point P. Amplifying the vibration produced at the point Q at this time to a target magnitude allows presentation of the target vibration at the point Q, while maintaining the point P vibration free. The driving signal at this time is now referred to as a first driving signal. Similarly, the dot-dash line of FIG. 16 represents the standing wave that is formed to have a node at the point Q. Amplifying the vibration produced at the point P at this time to a target magnitude allows presentation of the target vibration at the point P, while maintaining the point Q vibration free. The driving signal at this time is now referred to as a second driving signal.

Distinctive target vibrations can be presented at the point P and the point Q if the actuators 103 are driven by a signal obtained by adding up the first driving signal and the second driving signal. Accordingly, while the driving signal 113 is a signal resulting from adding up the first driving signal and the second driving signal, the first driving signal and the second driving signal both have a magnitude by a factor of $|1/\sin(2\pi d/\lambda_c)|$ of Case 1. Thus, one can see that the driving signal 113 obtained by the combination of the two also has a magnitude of, generally, a factor of $|1/\sin(2\pi d/\lambda_c)|$, as compared to Case 1.

From the foregoing, in order to present distinctive vibrations at the two touch locations 111 proximate to each other, the driving signal 113 having a magnitude proportional to $|1/\sin(2\pi d/\lambda_c)|$ (d is distance between the two), and the drive voltage for the driving signal 113 are required, and the longer the wavelength $\lambda_c$ is and the lower the fundamental frequency $f_c$ is, the greater the driving signal 113 and the magnitude of the drive voltage for the driving signal 113 are.

Figure 17:
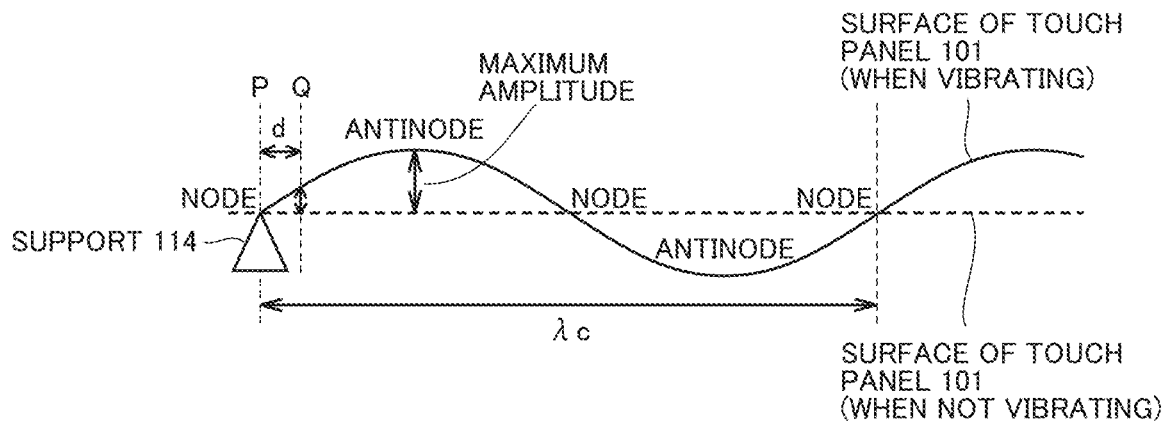
FIG. 17 is a schematic view depicting a cross section of the distribution of vibrations produced on the linear line on which the touch panel 101 lies.

FIG. 17 depicts a vibration waveform of Case 5. In Case 5, a vibration is presented at the touch location 111 close to the support 114.

Since the support 114 is where the touch panel 101 is restrained, the vibrations on the touch panel 101 are distributed in a sinusoidal manner in which a node lies at the support 114 at which the vibration has zero magnitude. In other words, the point P, maintained vibration free in Case 2, can be replaced with the support 114. The vibration produced at the point Q, which is apart from the support 114 by a certain distance d, has a magnitude of a factor of $|\sin(2\pi d/\lambda_c)|$ of the maximum amplitude of the standing wave.

Accordingly, even when a vibration is presented at the touch location 111 closer to the support 114, the driving signal 113 has a magnitude proportional to $|1/\sin(2\pi d/\lambda_c)|$, where d is the distance between the two. The longer the wavelength $\lambda_c$ is and the lower the fundamental frequency $f_c$ is, the greater the driving signal 113 and the drive voltage for the driving signal 113 are required to be.

<Comparison to Reference Example>

In light of the above, the functionality and advantages of the tactile sensation presentation device according to the present embodiment are now described by comparison to Reference Example.

Reference Example differs from Embodiment 1 in configuration of the fundamental frequency calculation unit 107 for calculating the fundamental frequency $f_c$.

In Reference Example, the fundamental frequency $f_c$ calculated by the fundamental frequency calculation unit 107 is predetermined as a constant, rather than being calculated in accordance with the procedure of STEP 1 of Embodiment 1.

The tactile sensation presentation device according to Reference Example differs from the tactile sensation presentation device according to Embodiment 1 in steps for calculation of the fundamental frequency $f_c$. In other words, in Reference Example, the target waveform $Y_m(f)$ and the driving signal $X_n(f)$ are calculated in accordance with STEPs 2 to 3 of Embodiment 1, using a predetermined value for $f_c$. Since details, other than the steps for calculation of the fundamental frequency $f_c$, are the same as the tactile sensation presentation device according to Embodiment 1, the description thereof will not be repeated.

As mentioned above, the driving signal 113 has a magnitude that is proportional to $|1/\sin(2\pi D_{min}/\lambda_c)|$ for $D_{min}$ which is the minimum distance between two points among the touch locations 111 and between any of the touch locations 111 and any of the supports 114.

In the tactile sensation presentation device according to Reference Example, the fundamental frequency $f_c$ is predetermined, and a corresponding wavelength $\lambda_c$ is also fixed. Thus, the less the $D_{min}$ is, the greater the driving signal 113 is. In other words, if two points proximate to each other are touched, or if a location near the support 114 is touched, the minimum distance $D_{min}$ is short. As a result, the driving signals 113 for presenting the target vibrations at the respective touch locations 111 have increased magnitudes.

As the driving signals 113 are increased as such, a larger drive voltage is required to output such driving signals 113, which increases the power consumed by the device. In addition, there is, in general, a limit for the maximum voltage that can be output from the device. Thus, desired vibrations may not be presented if the voltages of the driving signals 113 exceed the limit.

In the tactile sensation presentation device according to the present embodiment, in contrast, the fundamental frequency $f_c$ is determined so that the shorter the minimum distance $D_{min}$ is, the higher the fundamental frequency $f_c$ is (i.e., the shorter the wavelength/c is). If the minimum distance $D_{min}$ is small, the wavelength $\lambda_c$ is short, allowing the phase $(2\pi D_{min}/\lambda_c)$ determined by the wavelength $\lambda_c$ and the minimum distance $D_{min}$ to be maintained at a large value, as compared to Reference Example. In other words, even if the minimum distance $D_{min}$ is small, the magnitudes of the driving signals 113 can be limited, enabling the operation with a low voltage.

In particular, in the configuration in which the fundamental frequency $f_c$ is determined so that a corresponding wavelength $\lambda_c$ is equal to $(D_{min} \times \alpha)$ as the present embodiment, the phase difference between two points apart from each other by the minimum distance $D_{min}$ is a constant value at all times, as shown below.

[Math 6]

$$(2\pi D_{min}/\lambda_c) = (2\pi D_{min}/(D_{min} \times \alpha)) = (2\pi/\alpha) \qquad (6)$$

The driving signal has a value proportional to the following equation:

[Math 7]

$$|1/\sin(2\pi D_{min}/\lambda_c)| = |1/\sin(2\pi/\alpha)| \qquad (7)$$

In other words, the magnitude of the driving signal 113 is maintained at a certain magnitude corresponding to the phase difference $(2\pi/\alpha)$, independent of the minimum distance $D_{min}$.

Accordingly, if two points proximate to each other are touched, or if a location near the support 114 is touched, the voltage required to output the driving signals 113 remains substantially unchanged. Thus, the operation with a low voltage is allowed, while presenting the target vibrations at respective touch locations 111, without increasing the voltage required to output the driving signals 113.

<How to Set Constant α>

Next, an effective way of setting the constant α is now described.

Initially, considering the fact that vibrations distributed over the touch panel 101 are sinusoidal, if the minimum distance $D_{min}$ is one-fourth the wavelength $\lambda_c$, that is, $(\pi/2)$ in phase, the difference in vibration is maximized, facilitating the presentation of different vibrations at locations apart from each other by the minimum distance $D_{min}$.

According to Equation (6), the phase difference corresponding to the minimum distance $D_{min}$ is $(2\pi/\alpha)$. Thus, the phase difference is $(\pi/2)$ when $\alpha=4$. Accordingly, one can see that Equation (7) representing the magnitude of the driving signal 113 gives a maximum value of 1 when $\alpha=4$, best lowering the magnitudes of the driving signals 113.

Next, a description is given where the phase difference $(2\pi/\alpha)$ for the minimum distance $D_{min}$ is less than $(\pi/2)$, that is, where α is in a range greater than 4.

Since the magnitude of the driving signal 113 is proportional to the value of Equation (7), an increase in value of a increases the magnitude of the driving signal 113. The phase difference, which is secured between two points apart from each other by the minimum distance $D_{min}$, depends on constant α, and this allows for estimation of a required drive voltage. Thus, constant α may be set in accordance with the drive voltage allowable by the device.

For example, if $\alpha=6$, the phase difference of Equation (6) is $(\pi/3)$, and the value of Equation (7) representing the magnitude of the driving signal 113 is approximately 1.15. A drive voltage is required which is approximately 1.15 times greater than the drive voltage where $\alpha=4$ because the value of Equation (7) is 1 when $\alpha=4$. If $\alpha=12$, the phase difference of Equation (6) is $(\pi/6)$, and the value of Equation (7) representing the magnitude of the driving signal 113 is 2. In other words, a drive voltage is required which is approximately twice the drive voltage where α=4. If α=100, the phase difference of Equation (6) is (π/50), and the value of Equation (7) representing the magnitude of the driving signal 113 is approximately 15.9. In other words, a drive voltage is required which is approximately 15.9 times greater than the drive voltage where α=4.

Note that excessively increasing the voltage range that is allowable by the device is not undesirable in terms of the device design and cost. If the drive voltage can be ensured to have a twofold margin in a practical sense, it is appropriate to set a to 12 or less to determine the fundamental frequency $f_c$ so that the wavelength $\lambda_c$ is less than a twelvefold of the minimum distance $D_{min}$. This is why α=12 in the present embodiment.

Next, the case is described where the phase difference (2π/α) for the minimum distance $D_{min}$ is greater than (π/2), that is, α is in a range less than 4.

If α is less than 4, the phase difference of Equation (6) is greater than (π/2), and the value of Equation (7) representing the magnitude of the driving signal 113 is greater than when α=4 (the phase difference (π/2)). However, if the propagation direction of the vibrations formed on the touch panel 101 does not coincide with the direction connecting two points in the minimum distance $D_{min}$ therebetween, the wavelength produced in the direction connecting the two points in the minimum distance $D_{min}$ therebetween is longer than the wavelength $\lambda_c$. A specific description in this regard is now described, with reference to FIGS. 18 and 19.

Figure 18:
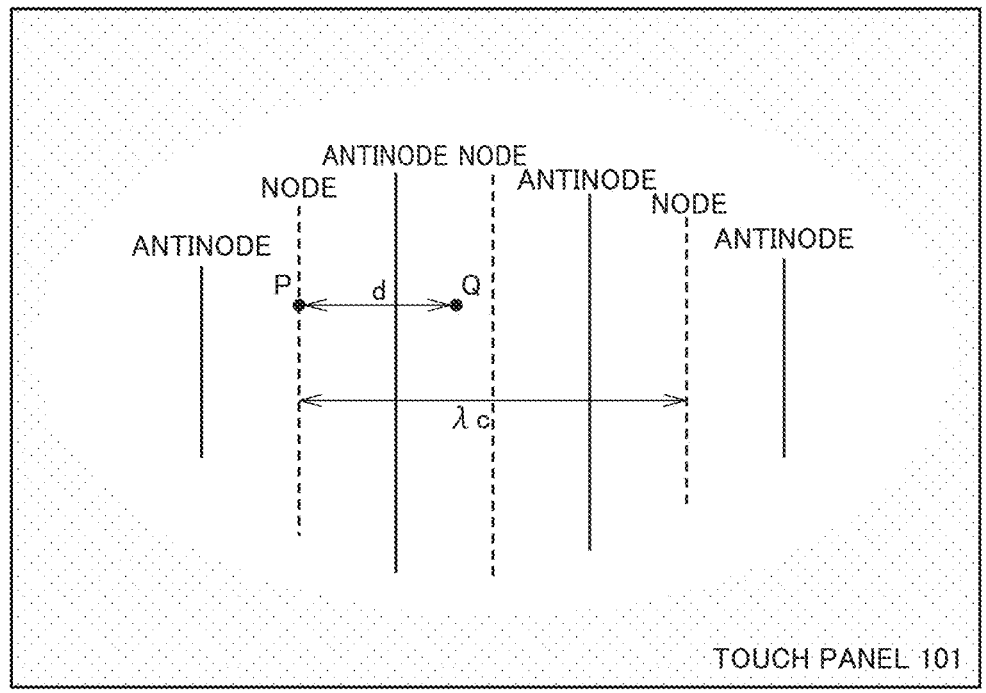
FIG. 18 is a diagram depicting a point P and a point Q in a minimum distance $D_{min}$ therebetween, and Example 1 of vibrations formed on the touch panel 101.

FIG. 18 is a diagram depicting the point P and the point Q that are in the minimum distance $D_{min}$, and Example 1 of the vibrations formed on the touch panel 101.

In FIG. 18, the direction connecting the point P and the point Q in the minimum distance $D_{min}$ coincides with the propagation direction of the vibrations formed on the touch panel 101. Since the minimum distance $D_{min}$ is greater than one-fourth of the wavelength $\lambda_c$ (i.e., (π/2) in terms of the phase difference), if the point P lies on a node of the standing wave, the point Q is beyond the antinode, and a great vibration cannot be obtained.

Figure 19:
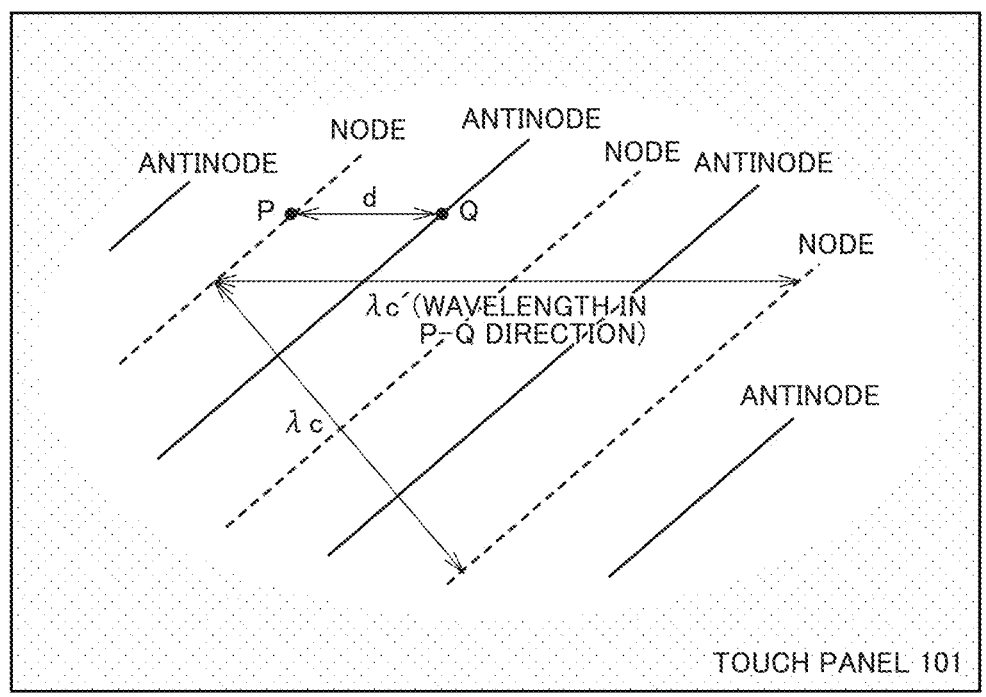
FIG. 19 is a diagram depicting the point P and the point Q in the minimum distance $D_{min}$ therebetween and Example 2 of vibrations formed on the touch panel 101.

FIG. 19 is a diagram depicting the point P and the point Q in the minimum distance $D_{min}$, and Example 2 of the vibrations formed on the touch panel 101.

In FIG. 19, the direction connecting the point P and the point Q in the minimum distance $D_{min}$ does not coincide with the propagation direction of the vibrations formed on the touch panel 101. The wavelength ($\lambda_c'$ of FIG. 19) in the direction connecting the point P and the point Q is longer than $\lambda_c$ even if the wavelength of the actual vibrations propagating over the touch panel 101 is $\lambda_c$. Then, in FIG. 19, since the minimum distance $D_{min}$ is exactly a factor of one-fourth of the wavelength $\lambda_c'$ (i.e., (π/2) in terms of the phase difference), the point Q lies on an antinode of the standing wave when the point P lies on a node of the standing wave, allowing a great vibration to be produced.

In other words, if α is greater than 4 and the phase difference (2π/α) for the minimum distance $D_{min}$ is greater than (π/2), the magnitudes and phases of the signals for driving the respective actuators 103 can be adjusted to form the distribution of vibrations whose wavelength in the direction connecting two points in the minimum distance $D_{min}$ is a factor of the minimum distance $D_{min}$. Thus, the driving signals 113 and the magnitudes of the drive voltages to output the driving signals 113 are substantially the same as those when α=4 (the phase difference (π/2)).

From the foregoing, the magnitude of the driving signal 113 can be best minimized by setting a to 4 or less and determining the fundamental frequency $f_c$ so that the wavelength $\lambda_c$ is one-fourth or less than the minimum distance $D_{min}$, thereby providing the effects of reduction of the drive voltage according to the present embodiment.

<Reasons why Fundamental Frequency $f_c$ is Calculated Based on Minimum Distance $D_{min}$>

In the present embodiment, the minimum distance $D_{min}$ is selected from among the distances between the touch locations 111_1 through M and the distances between the touch locations 111_1 through M and the supports 114_1 through K of the panel, and the fundamental frequency $f_c$ is calculated based on the minimum distance $D_{min}$. In the following, the reasons for this are described.

As mentioned above, if distinctive vibrations are presented to the two touch locations 111 on the touch panel 101, or if a vibration is presented to the touch location 111 near the support 114, the greater the distance between those two points, the greater the driving signals 113 are if the vibrations have the same fundamental frequency $f_c$.

Accordingly, if the fundamental frequency $f_c$ is determined so that the drive voltage can be sufficiently reduced at two points closest to each other among the combination of the two touch locations 111 and the combination of the support 114 and the touch location 111, the driving signals 113 require no voltage above that drive voltage to present vibrations at other touch locations 111.

In other words, since the magnitude of the driving signal 113 depends on the distance $D_{min}$ between two points closest to each other among the combination of the two touch locations 111 and the combination of the support 114 and the touch location 111, the determination of the fundamental frequency $f_c$ based on the minimum distance $D_{min}$ enables the presentation of the target vibrations at all the touch locations 111.

From the foregoing, the tactile sensation presentation device according to the present embodiment allows the operation with a low voltage, while presenting desired vibrations at the touch locations 111, without increasing the voltage required to output the driving signals 113.

Embodiment 2

A tactile sensation presentation device according to Embodiment 2 is the same as the tactile sensation presentation device 1 according to Embodiment 1, except for the step of calculation of the fundamental frequency $f_c$ by the fundamental frequency calculation unit 107 of the signal processing device 105 (i.e., the steps for calculation of the fundamental frequency $f_c$ in STEP 1). Therefore, the description of the operations in STEP 2 and the subsequent steps will not be repeated. In the following, the tactile sensation presentation device according to the present embodiment will be described, mainly with respect to the differences from Embodiment 1.

<Differences in Configuration and Operation>

The present embodiment differs from Embodiment 1 in that the fundamental frequency $f_c$ that is calculated based on STEP 1 is 300 Hz if the frequency (which is referred to as a temporary fundamental frequency in the present embodiment), whose wavelength is a factor of α of a minimum distance $D_{min}$, is greater than or equal to 300 Hz.

Figure 20:
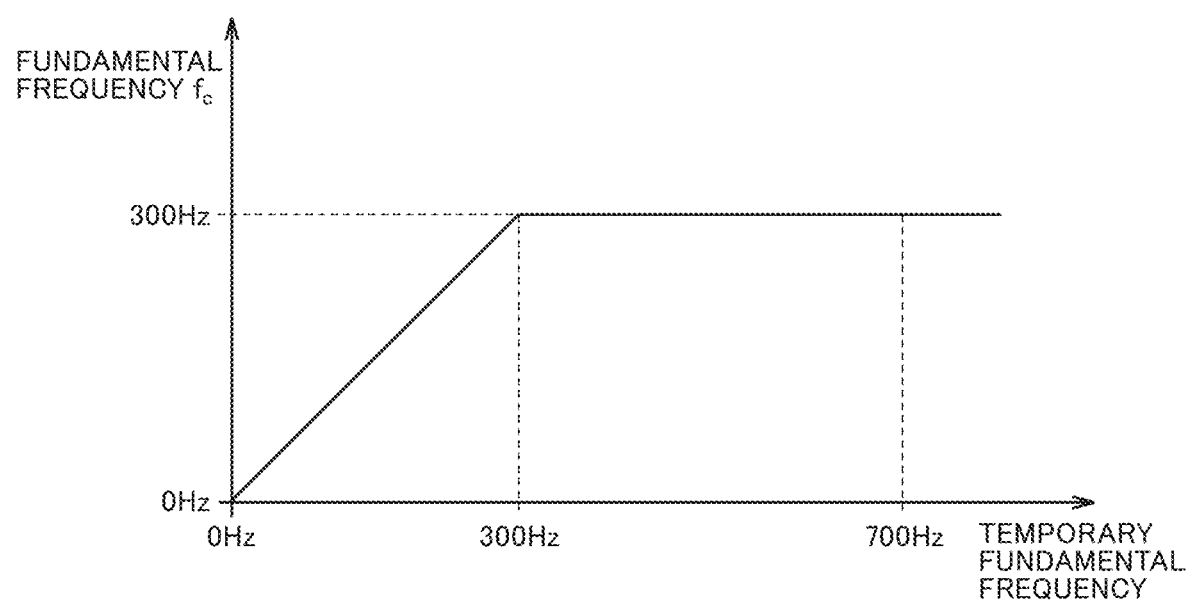
FIG. 20 is a diagram depicting a temporary fundamental frequency versus a fundamental frequency $f_c$, according to Embodiment 2.

FIG. 20 is a diagram depicting the temporary fundamental frequency versus the fundamental frequency $f_c$, according to Embodiment 2. Referring to FIG. 20, for example, suppose that the temporary fundamental frequency calculated based on the minimum distance $D_{min}$, a constant α, and Equation (1) according to STEP 1 is 700 Hz. In such a case, in the present embodiment, the fundamental frequency calculation unit 107 sets the fundamental frequency $f_c$ to 300 Hz.

<Functionality and Advantages>

Functionality and advantages are described below.

In Embodiment 1, the fundamental frequency $f_c$ is calculated so that a wavelength $\lambda_c$ is a factor of a of the minimum distance $D_{min}$. Thus, the shorter the minimum distance $D_{min}$ is, the shorter a corresponding wavelength $\lambda_c$ is. Consequently, the calculated fundamental frequency $f_c$ has a greater value.

However, due to the characteristics of pacinian corpuscles, which is a type of mechanoreceptor, the tactile sensation of a human's finger is known to have good tactile sensation sensitivity to the vibrations having frequencies around 100 to 300 Hz. If the frequency is greater than or equal to 300 Hz, in contrast, the sensitivity of a finger gradually decreases, making the finger difficult to sense the vibrations as a haptic sensation.

The human auditory sense has the best sensitivity for the sounds around 1 to 4 kHz. For the frequencies in the ranges lower than 1 kHz, the higher the frequency is, the higher the sensitivity is. Accordingly, at the frequencies around 100 to 300 Hz, the higher the fundamental frequency $f_c$ is, the easier the user is made to sense the presented vibration as a sound. However, such a sound emitted by accident should not be sensed by the user. In terms of perception of a sound, desirably, the fundamental frequency $f_c$ is set as low as possible.

In other words, in Embodiment 1, if the minimum distance $D_{min}$ is small, the fundamental frequency $f_c$ excessively increases and a human's finger has less tactile sensation sensitivity, making a human's finger difficult to sense the stimulus by vibrations. Similarly, if the fundamental frequency $f_c$ has an excessive value, the user is made easier to sense the vibrations as a sound, causing him/her to hear unwanted sound.

With this in mind, in Embodiment 2, suppose that the upper limit for the fundamental frequency $f_c$ is 300 Hz at which a human's finger has excellent tactile sensation sensitivity. This enables, where possible, the operation at a low voltage, while presenting a desired vibration at the touch location 111 and reducing the voltage required to output the driving signal 113. The fundamental frequency calculation unit 107 sets the fundamental frequency $f_c$ to 300 Hz if the frequency corresponding to the wavelength, which is a factor of a of the minimum distance $D_{min}$, exceeds 300 Hz. This allows presentation of a haptic sensation with a vibration having a frequency that is easy for the user to perceive, without sensing an unpleasant sound.

Embodiment 3

<Display Device>

A display device which includes a tactile sensation presentation device according to the present embodiment can be configured as an apparatus using the tactile sensation presentation device according to the present embodiment.

Figure 21:
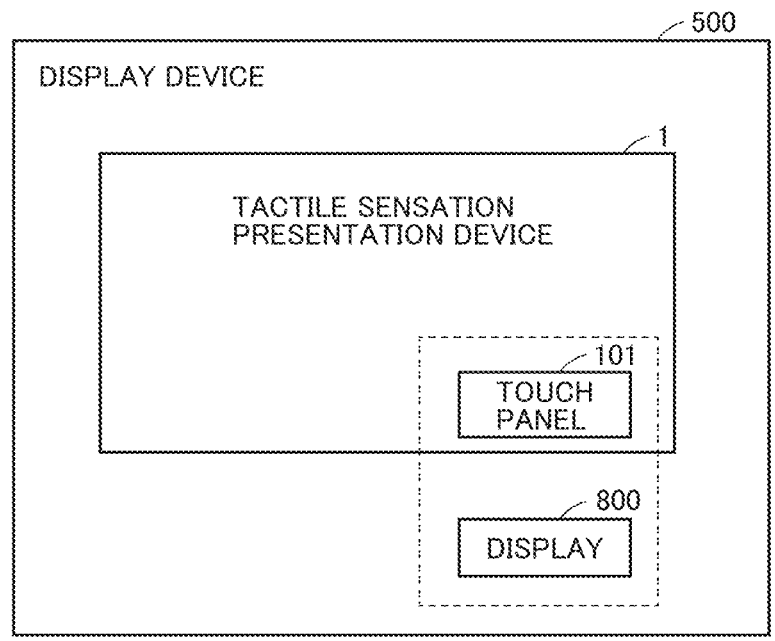
FIG. 21 is a block diagram depicting a configuration of a display device 500.

FIG. 21 is a block diagram depicting a configuration of a display device 500.

The display device 500 includes a tactile sensation presentation device 1 and a display 800. The tactile sensation presentation device 1 includes a touch panel 101 that is integrally formed with the display 800 such as a TFT or an organic EL so as to display image data. This not only enables the operation at a low voltage, while presenting a desired tactile stimulation at a touch location 111, but also allows the display of GUI objects such as buttons, knobs, or a slidebar as images on the touch panel 101 to present a method of touch operation to a user in an intuitive manner.

Embodiment 4

<Data Terminal Device>

A data terminal device which includes a tactile sensation presentation device according to the present embodiment can be configured as another apparatus using the tactile sensation presentation device according to the present embodiment. Here, a data terminal device is a device that includes functionality of allowing a user to provide data input by touch operation, for example, ticket machines, an ATM, a car-navigation system, smartphone, a tablet PC, etc.

Figure 22:
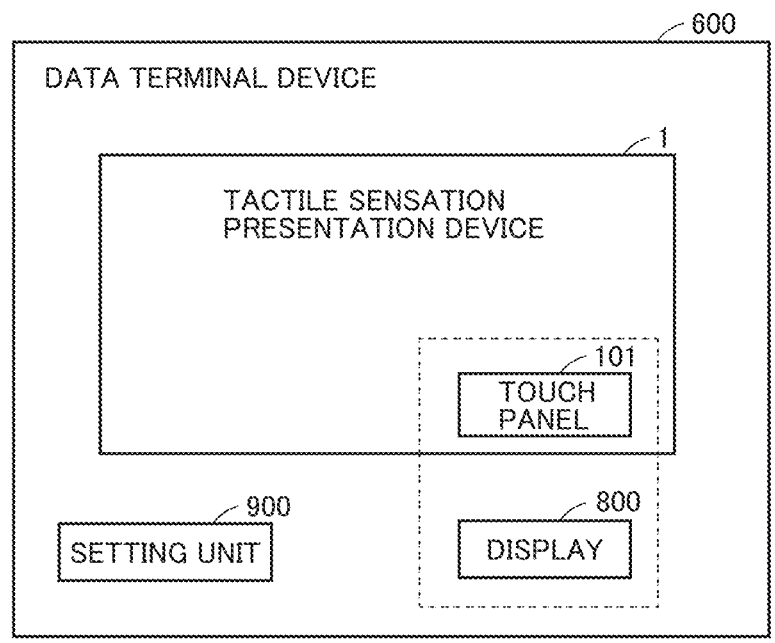
FIG. 22 is a block diagram depicting a configuration of a data terminal device 600.

FIG. 22 is a block diagram depicting a configuration of a data terminal device 600.

The data terminal device 600 includes a tactile sensation presentation device 1, a display 800, and a setting unit 900. The tactile sensation presentation device 1 includes a touch panel 101 that is integrally formed with the display 800 such as a TFT or an organic EL so as to display image data. The setting unit 900 includes a setting unit (not shown) which outputs to the input unit 106 a stimulation type 112 according to the content to be displayed. This not only enables the operation at a low voltage, while presenting a desired tactile stimulation at a touch location 111, but also allows presentation of an appropriate haptic sensation in accordance with types and arrangement of GUI objects such as a displayed button, knob, slidebar, etc.

<Example Hardware Configuration of Signal Processing Device>

Figure 23:
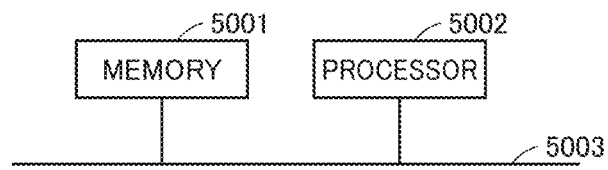
FIG. 23 is a diagram depicting an example hardware configuration of a signal processing device 105.

FIG. 23 is a diagram depicting an example hardware configuration of a signal processing device 105.

If the functionality of the signal processing device 105 is implemented in software, the signal processing device 105 includes, for example, a processor 5002 and a memory 5001 connected together by a bus 5003, as shown in FIG. 2, and the processor 5002 can execute programs stored in the memory 5001.

As described above, Embodiments 1 to 2 have been described as an illustration of the technique disclosed herein. However, the technique according to the present disclosure is not limited thereto, and modification, substitution, addition, omission, etc., can be made, as appropriate, to the embodiments. The components described in Embodiments 1 to 2 above may be combined into a new embodiment.

REFERENCE SIGNS LIST 1 tactile sensation presentation device; 101 touch panel; 102 housing; 103 actuator; 104 touch sensor; 105 signal processing device; 106 input unit; 107 fundamental frequency calculation unit; 108 target waveform calculation unit; 109 driving signal calculation unit; 110 output unit; 111 touch location; 112 stimulation type; 113 driving signal; 114 support; 500 display device; 600 data terminal device; 800 display; 900 setting unit; 5001 memory; 5002 processor; and 5003 bus.

The invention claimed is:

1. A tactile sensation presentation device, comprising:
a touch panel;
a housing to support the touch panel;
a plurality of actuators disposed at different locations so as to cause the touch panel to vibrate;

a touch sensor to detect a touch location at which a user's finger or a joystick is in contact with the touch panel; and a signal processing device to: receive the touch location from the touch sensor and a stimulation type to be presented at the touch location; generate driving signals for driving the plurality of actuators; and output the driving signals to the plurality of actuators, wherein the signal processing device includes:

an inputter to which the touch location touched by the user and the stimulation type for the touch location are input;

a fundamental frequency calculator for calculating a fundamental frequency from the touch location;

a target waveform calculator for modulating a waveform of the fundamental frequency by an envelope waveform of a vibration according to the stimulation type to be presented at the touch location, to calculate a target waveform for the vibration to be presented at the touch location;

a driving signal calculator for multiplying the target waveform by inverse characteristics of transfer characteristics from each of the plurality of actuators to the touch location to generate the driving signals for driving the plurality of actuators; and an outputter for outputting the driving signals to the plurality of actuators, wherein the fundamental frequency calculator calculates the fundamental frequency based on a first distance so that the shorter the first distance is, the higher the fundamental frequency is, the first distance being a minimum distance among distances between touch locations and between a touch location and the support of the touch panel.

2. The tactile sensation presentation device according to claim 1, wherein the fundamental frequency calculator sets an upper limit for the fundamental frequency to 300 Hz.

3. The tactile sensation presentation device according to claim 1, wherein the fundamental frequency calculator calculates the fundamental frequency so that the fundamental frequency has a wavelength that is proportional to the first distance.

4. The tactile sensation presentation device according to claim 1, wherein the fundamental frequency calculator calculates the fundamental frequency so that the fundamental frequency has a wavelength that is less than a factor of 4 of the first distance.

5. A display device, comprising:

the tactile sensation presentation device according to claim 1; and a display to display an GUI object for operation, the display being integrally formed with the touch panel.

6. A data terminal device, comprising:

the tactile sensation presentation device according to claim 1;

a display to display an GUI object for operation, the display being integrally formed with the touch panel; and a setter to output to the inputter the stimulation type according to content to be displayed on the display.

7. A tactile sensation presentation method for presenting tactile stimulation to a tactile sensation presentation device, the tactile sensation presentation device including:

a touch panel;

a housing supporting the touch panel;

a plurality of actuators disposed at different locations so as to cause the touch panel to vibrate;

a touch sensor for detecting a touch location at which a user's finger or a joystick is in contact with the touch panel; and a signal processing device for receiving the touch location from the touch sensor and a stimulation type to be presented at the touch location, generating driving signals for driving the plurality of actuators, and outputting the driving signals to the plurality of actuators, the method, comprising:

inputting the touch location touched by the user and the stimulation type for the touch location;

calculating a fundamental frequency from the touch location;

modulating a waveform of the fundamental frequency by an envelope waveform of a vibration according to the stimulation type to be presented at the touch location, to calculate a target waveform for the vibration to be presented at the touch location;

multiplying the target waveform by inverse characteristics of transfer characteristics from each of the plurality of actuators to the touch location to generate the driving signals for driving the plurality of actuators; and outputting the driving signals to the plurality of actuators, wherein calculating the fundamental frequency includes calculating the fundamental frequency based on a first distance so that the shorter the first distance is, the higher the fundamental frequency is, the first distance being a minimum distance among distances between touch locations and between a touch location and the support of the touch panel.

8. The tactile sensation presentation method according to claim 7, wherein calculating the fundamental frequency includes setting an upper limit for the fundamental frequency to 300 Hz.

9. The tactile sensation presentation method according to claim 7, wherein calculating the fundamental frequency includes calculating the fundamental frequency so that the fundamental frequency has a wavelength that is proportional to the first distance.

10. The tactile sensation presentation method according to claim 7, wherein calculating the fundamental frequency includes calculating the fundamental frequency so that the fundamental frequency has a wavelength that is less than a factor of 4 of the first distance.

* * * * *